United States Patent
Saito

(10) Patent No.: US 10,839,758 B2
(45) Date of Patent: Nov. 17, 2020

(54) IMAGE DISPLAY APPARATUS, IMAGE OUTPUT APPARATUS, AND CONTROL METHODS THEREOF

(71) Applicant: CANON KABUSHIKI KAISHA, Tokyo (JP)

(72) Inventor: Tetsuji Saito, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 428 days.

(21) Appl. No.: 15/575,901

(22) PCT Filed: May 30, 2016

(86) PCT No.: PCT/JP2016/002617
§ 371 (c)(1),
(2) Date: Nov. 21, 2017

(87) PCT Pub. No.: WO2016/194362
PCT Pub. Date: Dec. 8, 2016

(65) Prior Publication Data
US 2018/0144693 A1    May 24, 2018

(30) Foreign Application Priority Data
Jun. 4, 2015   (JP) .................. 2015-114245

(51) Int. Cl.
*G09G 3/34*   (2006.01)
*G11B 20/10*  (2006.01)
(Continued)

(52) U.S. Cl.
CPC .......... *G09G 3/3406* (2013.01); *G09G 3/36* (2013.01); *G11B 20/10* (2013.01); *G11B 27/005* (2013.01);
(Continued)

(58) Field of Classification Search
CPC ...... H04B 10/54; H04B 10/67; H04B 10/541; H04N 5/23245; H04N 5/57; H04N 5/76;
(Continued)

(56) References Cited

U.S. PATENT DOCUMENTS 7,535,516 B2 * 5/2009 Kunita ............... H04N 5/44513
                                                          345/212
7,605,780 B2 * 10/2009 Jung ................... G09G 3/2944
                                                          345/60
(Continued)

FOREIGN PATENT DOCUMENTS

CN      1874418 A     12/2006
CN      103339931 A   10/2013
(Continued)

OTHER PUBLICATIONS

G. Impoco et al. "Adaptive Reduction of the Dymaics of HDR Video Sequences", IEEE International Conference on Image Processing 2005, vol. 1, IEEE, Sep. 11, 2005, pp. 945-948, ISSN: 1522-4880, Cited in the ISR.
(Continued)

*Primary Examiner* — Duc Q Dinh
(74) *Attorney, Agent, or Firm* — Cowan, Liebowitz & Latman, P.C.

(57) ABSTRACT

An image display apparatus according to the present invention includes: a display unit configured to display a moving image based on input moving image data; a determining unit configured to determine whether or not a specific reproduction operation related to a reproduction method of the moving image data has been performed; and a control unit configured to control display by the display unit so that display of a moving image of which brightness is higher than a first threshold is suppressed in a case where the specific reproduction operation has been performed.

20 Claims, 21 Drawing Sheets

(51) Int. Cl.
H04N 21/433 (2011.01)
H04N 21/431 (2011.01)
G09G 3/36 (2006.01)
G11B 27/00 (2006.01)
H04N 9/87 (2006.01)
H04N 21/4402 (2011.01)
G09G 5/10 (2006.01)

(52) U.S. Cl.
CPC ............ *H04N 9/87* (2013.01); *H04N 21/433* (2013.01); *H04N 21/4312* (2013.01); *H04N 21/4333* (2013.01); *H04N 21/440263* (2013.01); *G09G 5/10* (2013.01); *G09G 2320/0233* (2013.01); *G09G 2320/0271* (2013.01); *G09G 2320/064* (2013.01); *G09G 2320/066* (2013.01); *G09G 2320/0626* (2013.01); *G09G 2320/0646* (2013.01); *G09G 2320/0686* (2013.01); *G09G 2340/04* (2013.01); *G09G 2370/12* (2013.01); *G09G 2370/16* (2013.01)

(58) Field of Classification Search
CPC ........... H04N 1/00458; H04N 21/4318; H04N 5/355; H04N 13/128; H04N 13/133; H04N 1/2129; H04N 1/2137; G09G 2320/0261; G09G 2320/0271; G09G 2320/062; G09G 2320/064; G09G 3/3406; G09G 2320/0646; G09G 2320/0626; G09G 3/342; G09G 2320/0233; G09G 5/10; G09G 2320/066; G09G 2330/022; G09G 2320/0606; G09G 2330/021; G09G 2300/0452; G09G 3/3413; G09G 2360/144; G09G 2320/0247; G09G 2320/0613; G09G 2340/16; G09G 1/002
USPC ......................................................... 345/102
See application file for complete search history.

(56) References Cited

U.S. PATENT DOCUMENTS

| 8,847,968 B2* | 9/2014 | Rabii ..................... G09G 5/363 345/158 |
|---|---|---|
| 2006/0007250 A1 | 1/2006 | Jung et al. |
| 2009/0324074 A1 | 12/2009 | Dembo |
| 2012/0038694 A1* | 2/2012 | Nakanishi ............ G09G 3/3426 345/694 |
| 2015/0070376 A1* | 3/2015 | Fujine ...................... H04N 5/20 345/589 |
| 2015/0356905 A1* | 12/2015 | Watanabe ............ G09G 3/2003 345/88 |
| 2016/0080714 A1 | 3/2016 | Tsukagoshi |

FOREIGN PATENT DOCUMENTS

| JP | 59-054390 A | 3/1984 |
|---|---|---|
| JP | 07-154747 A | 6/1995 |
| JP | 2009-109731 A | 5/2009 |
| JP | 2010-192948 A | 9/2010 |
| JP | 2011-257469 A | 12/2011 |
| JP | 2016-092576 A | 5/2016 |
| KR | 10-2005-0112251 A | 11/2005 |
| WO | 2013/046095 A1 | 4/2013 |
| WO | 2014/178286 A1 | 11/2014 |

OTHER PUBLICATIONS

Ishtiaq Rasool Khan "Two Layer Scheme for Encoding of High Dynamic Range Images", 2008 IEEE International Conference on Acoustics, Speech and Signal Processing, IEEE, Mar. 31, 2008, pp. 1169-1172, ISSN: 1520-6149, Cited in the ISR.

The above U.S. references, Foreign references 3-5 and NPLs 1 and 2 were cited in the Search Report of International Application No. PCT/JP2016/002617 dated Aug. 30, 2016.

The above patent documents were cited in a European Search Report dated Feb. 26, 2019, which is enclosed, that issued in the corresponding European Patent Application No. 16802804.1.

The above patent documents were cited in the Dec. 10, 2018 Korean Office Action, which is enclosed without an English Translation, that issued in Korean Patent Application No. 10-2017-7036966.

The above foreign patent documents were cited in a May 7, 2020 Chinese Office Action, which is enclosed with an English Translation, that issued in Chinese Patent Application No. 201680032673.2.

* cited by examiner

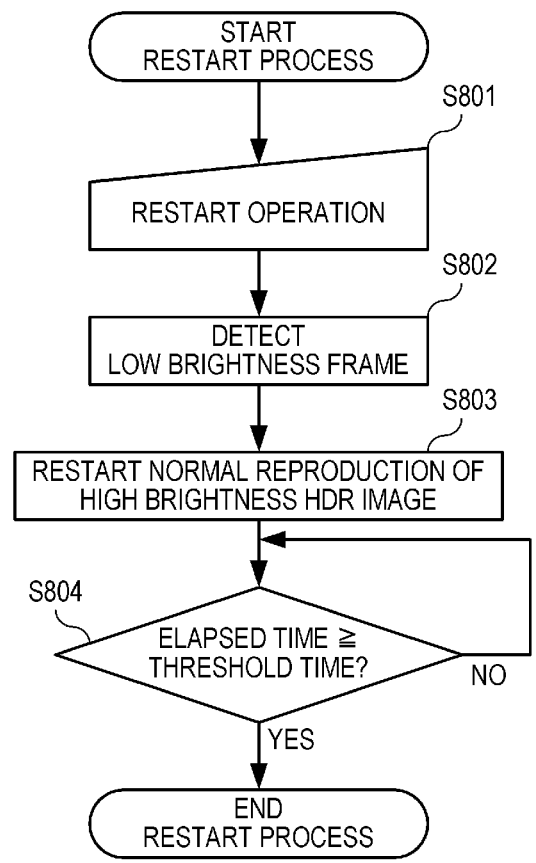
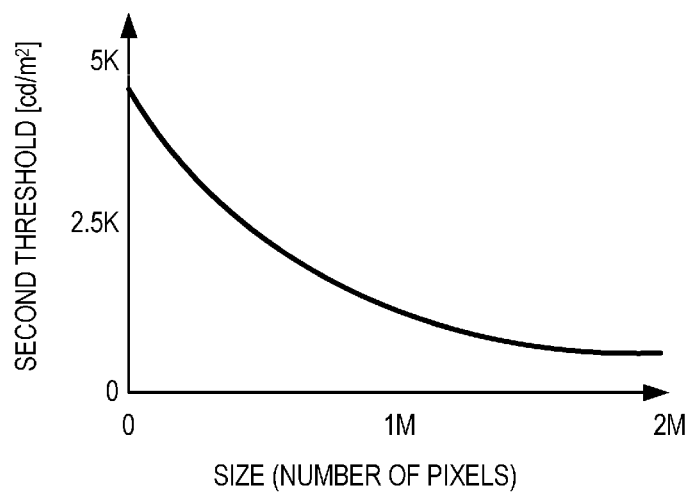

FIG. 13

| REPRODUCTION OPERATION | PERMISSION INFORMATION | CONTROL INFORMATION | |
|---|---|---|---|
| | | FIRST CONTROL INFORMATION | SECOND CONTROL INFORMATION |
| PAUSE OPERATION | PERMITTED | PRIORITIZE DISPLAY OF HIGH BRIGHTNESS HDR IMAGE STOP REPRODUCTION IN A CASE WHERE DISPLAY CANNOT BE MAINTAINED | RESTART REPRODUCTION FROM READING FRAME OF LOW BRIGHTNESS SCENE |
| SLOW REPRODUCTION OPERATION | PERMITTED | REDUCE MAXIMUM BRIGHTNESS BY 30% | |
| FAST FORWARD OPERATION | PERMITTED | SWITCH FROM SECOND BRIGHTNESS RANGE TO FIRST BRIGHTNESS RANGE | CHANGE FROM SECOND BRIGHTNESS RANGE TO FIRST BRIGHTNESS RANGE IN STAGES |
| FAST REWIND OPERATION | PERMITTED | | |
| ENLARGEMENT OPERATION | PERMITTED | REDUCE MAXIMUM BRIGHTNESS IN ACCORDANCE WITH ENLARGEMENT RATE | |
| REDUCTION OPERATION | PERMITTED | REPRODUCE LDR IMAGE | CHANGE FROM LDR IMAGE TO HIGH BRIGHTNESS HDR IMAGE IN STAGES |
| BRIGHTNESS ADJUSTMENT OPERATION | PROHIBITED | — | — |

[Fig. 24]

IMAGE DISPLAY APPARATUS, IMAGE OUTPUT APPARATUS, AND CONTROL METHODS THEREOF

CROSS-REFERENCE TO RELATED APPLICATIONS

This application is a national stage application of International Application No. PCT/JP2016/002617 filed May 30, 2016, whose benefit is claimed and which claims the benefit of Japanese Patent Application No. 2015-114245, filed Jun. 4, 2015, the entire disclosure of which are incorporated herein by reference.

TECHNICAL FIELD

The present invention relates to an image display apparatus, an image output apparatus, and control methods thereof.

BACKGROUND ART

Recently, with improvements in the performance of imaging sensors, advancements in techniques related to image processing, and the like, HDR (High Dynamic Range) image data is becoming widely used. HDR image data refers to image data with a color depth of more than 8 bits. HDR image data can be described as "image data with a wide range of obtainable values of a gradation value of the image data". For example, HDR image data is generated by combining a plurality of pieces of image data respectively obtained at a plurality of exposures that differ from each other.

With improvements in the performance of image display apparatuses, techniques that realize high brightness display are beginning to be proposed. For example, with improvements in the performance of LEDs (Light Emitting Diodes) which are used as a light source of a backlight unit of liquid crystal display apparatuses, techniques which realize high brightness display by controlling emission brightness of the backlight unit are being proposed.

For example, in a case where an image creator creates HDR image data that is intended to be reproduced by an image display apparatus (image reproduction apparatus) capable of realizing high brightness display, the HDR image data is created so that a white image with a small area stands out on a screen. Specifically, the image creator determines a change in brightness between frames, a change in brightness between scenes, maximum brightness of each frame, maximum brightness of each scene, and the like so that a white image with a small area stands out on the screen.

In addition, HDR image data that is intended to be reproduced by image display apparatuses capable of realizing high brightness display are expected to become more widely used in the future. Hereinafter, HDR image data that is intended to be reproduced by an image display apparatus capable of realizing high brightness display will be referred to as "high brightness HDR image data" in order to distinguish such HDR image data from other HDR image data.

Such high brightness HDR image data is distributed through, for example, a network. In addition, conceivably, high brightness HDR image data may be generated at an image output apparatus to be transmitted to an image display apparatus without involving a network. As an image output apparatus, an imaging apparatus which generates high brightness HDR image data through imaging, a set top box which receives and outputs high brightness HDR image data, and the like may be used. Furthermore, conceivably, a plurality of image display apparatuses may be daisy-chained to each other, in which case high brightness HDR image data may be output from one image display apparatus to another image display apparatus. To this end, an image display apparatus may be used as an image output apparatus.

As a method of transmitting high brightness HDR image data, a method involving transmitting two streams is proposed. A main stream which is one of the two streams stores LDR (Low Dynamic Range) image data. LDR image data refers to, for example, image data with a color depth of 8 bits. Generally, an LDR image (an image represented by LDR image data) can be reproduced by an image display apparatus that is incapable of reproducing an image represented by HDR image data or high brightness HDR image data. A sub stream which is the other of the two streams stores difference data and metadata. Difference data is data related to a difference between HDR image data and LDR image data. Metadata stores brightness data related to brightness of a high brightness HDR image (an image represented by high brightness HDR image data). For example, brightness data includes a change in brightness between frames, a change in brightness between scenes, maximum brightness of each frame, maximum brightness of each scene, and the like.

Image display apparatuses and image output apparatuses are capable of accepting various user operations. For example, as a user operation, a reproduction operation that is a user operation related to an image reproduction method may be performed. Reproduction operations include a pause operation for temporarily stopping the reproduction of the moving image, a slow reproduction operation for reducing an image reproduction speed, and the like.

Let us now consider a case where a pause operation or a slow reproduction operation is performed at a timing of reproduction (display) of a high brightness HDR image whose brightness is high. In this case, display may be performed for a long period of time at a high brightness such as 5000 $[cd/m^2]$. Display for a long period of time at high brightness impairs eyesight in various ways and is unfavorable in terms of visual recognition of an image by a user.

PTLs 1 and 2 disclose examples of conventional art related to image display apparatuses. PTLs 1 and 2 disclose techniques for preventing screen burn-in of an impulse-emission plasma display and the like. Specifically, with an image display apparatus disclosed in PTL 1, a determination is made on whether or not a display state of a display unit is a still image display state. In addition, in a case where it is determined that the display state is a still image display state, pixels having a brightness level equal to or higher than a predetermined brightness level are replaced into a specific pattern. According to the technique disclosed in PTL 2, a control apparatus determines an operating state of an image output apparatus, and in a case where the control apparatus determines that the operating state is a paused state which has continued for a predetermined period of time or longer, the control apparatus instructs the image output apparatus to cancel the paused state.

CITATION LIST

Patent Literature

[PTL 1]
Japanese Patent Application Laid-open No. 2011-257469
[PTL 2]
Japanese Patent Application Laid-open No. 2009-257469

SUMMARY OF INVENTION

Technical Problem

However, the conventional art described above is only capable of detecting a still state of a reproduced image (an image that has been reproduced (displayed)). In other words, a state of the reproduced image after a reproduction operation other than a pause operation is performed cannot be detected. Therefore, even if the conventional art described above is used, reproduction of images that are not favorable in terms of visual recognition of an image by a user (for example, an image that causes visual impairment) cannot be suppressed.

The present invention provides a technique that enables a favorable image to be reproduced in a more reliable manner in a case where various reproduction operations are performed.

Solution to Problem

The present invention in its first aspect provides an image display apparatus comprising:
a display unit configured to display a moving image based on input moving image data;
a determining unit configured to determine whether or not a specific reproduction operation related to a reproduction method of the moving image data has been performed; and
a control unit configured to control display by the display unit so that display of a moving image of which brightness is higher than a first threshold is suppressed in a case where the specific reproduction operation has been performed.

The present invention in its second aspect provides an image output apparatus comprising:
an output unit configured to output moving image data to a display apparatus;
a determining unit configured to determine whether or not a specific reproduction operation related to a reproduction method of the moving image data has been performed; and
a control unit configured to control output by the output unit so that display of a moving image of which brightness is higher than a first threshold is suppressed in a case where the specific reproduction operation has been performed.

The present invention in its third aspect provides a control method for an image display apparatus which includes a display unit that displays a moving image based on input moving image data, the control method comprising:
determining whether or not a specific reproduction operation related to a reproduction method of the moving image data has been performed; and
controlling display by the display unit so that display of a moving image of which brightness is higher than a first threshold is suppressed in a case where the specific reproduction operation has been performed.

The present invention in its fourth aspect provides a control method for an image output apparatus which includes an output unit that outputs moving image data to a display apparatus, the control method comprising:
determining whether or not a specific reproduction operation related to a reproduction method of the moving image data has been performed; and
controlling output by the output unit so that display of a moving image of which brightness is higher than a first threshold is suppressed in a case where the specific reproduction operation has been performed.

The present invention in its fifth aspect provides a program which causes a computer to execute the respective steps of the control method of an image display apparatus described above. The present invention in its sixth aspect provides a program which causes a computer to execute the respective steps of the control method of an image output apparatus described above.

Advantageous Effects of Invention

According to the present invention, a favorable image can be reproduced in a more reliable manner in a case where various reproduction operations are performed.

Further features of the present invention will become apparent from the following description of exemplary embodiments with reference to the attached drawings.

BRIEF DESCRIPTION OF DRAWINGS

FIG. 8 is a flow chart showing an example of a restart process according to the first embodiment;

FIG. 9 is a diagram showing an example of a second threshold according to the first embodiment;

FIG. 13 is a diagram showing an example of control information according to the second embodiment;

DESCRIPTION OF EMBODIMENTS

First Embodiment

Hereinafter, an image reproduction apparatus and an image reproduction method according to a first embodiment of the present invention will be described. In the present embodiment, an example of a case in which an image reproduction apparatus is a transmission liquid crystal display apparatus will be described. A transmission liquid crystal display apparatus includes a backlight unit which is a light-emitting unit and a liquid crystal panel which is a display unit that displays an image by modulating light emitted from the backlight unit. However, image display apparatuses to which the present invention is applicable are not limited to a transmission liquid crystal display apparatus. For example, the present invention can also be applied to a reflective liquid crystal display apparatus, a MEMS (Micro Electro Mechanical System) shutter system display apparatus which uses a MEMS shutter instead of liquid crystal elements, and the like. The present invention can also be applied to self-luminous image display apparatuses such as an organic EL display apparatus and a plasma display apparatus. The present invention can also be applied to a projector.

Figure 1:
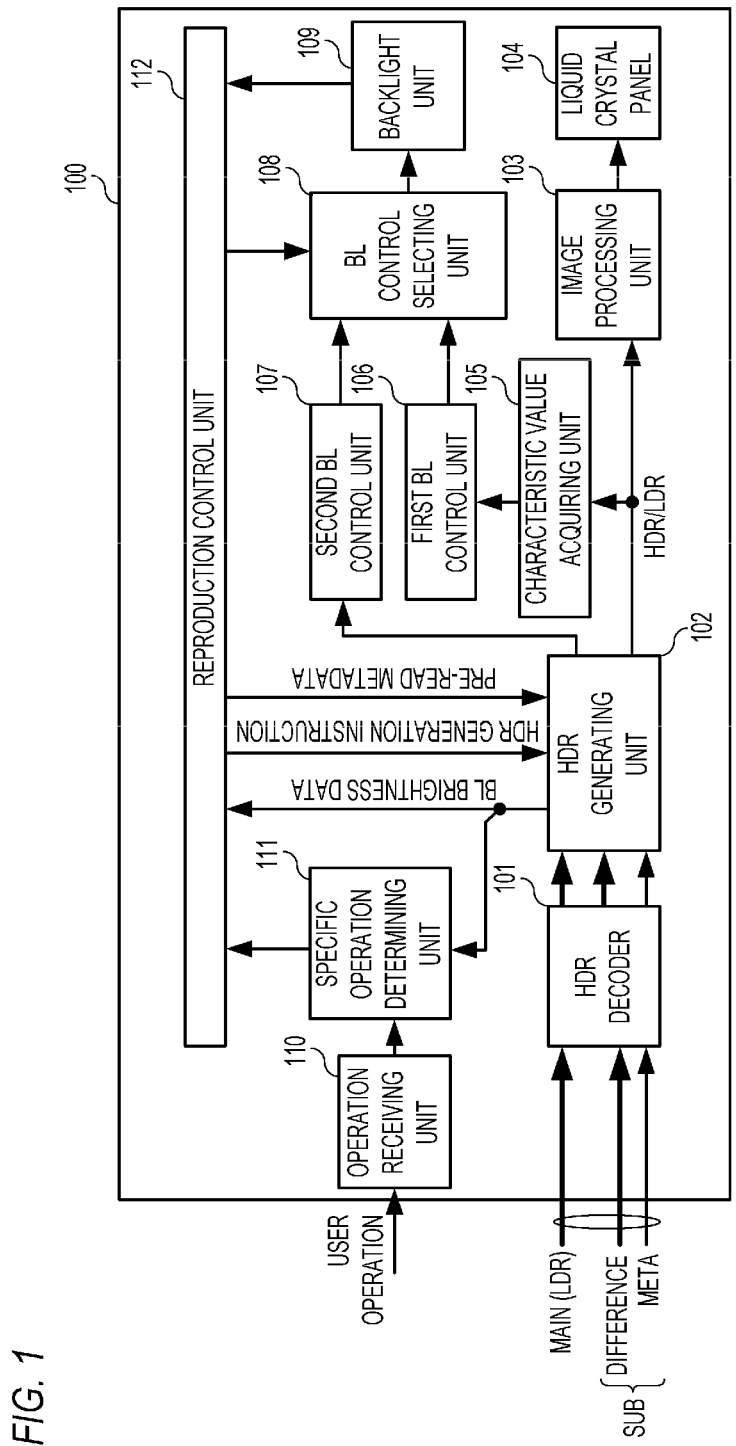
FIG. 1 is a block diagram showing an example of a functional configuration of an image display apparatus according to a first embodiment.

FIG. 1 is a block diagram showing an example of a functional configuration of an image display apparatus (image reproduction apparatus) 100 according to the present embodiment. The image display apparatus 100 is an apparatus capable of reproducing a high brightness HDR image that is an image represented by high brightness HDR image data. High brightness HDR image data refers to HDR image data that includes a high brightness image region, a high brightness frame, a high brightness scene, or the like. HDR image data is, for example, image data with a color depth of more than 8 bits. In the present embodiment, HDR image data is image data with a color depth of 12 bits. In the following description, "HDR image data" refers to HDR image data other than high brightness HDR image data.

The image display apparatus 100 acquires (receives) high brightness HDR image data and reproduces (displays) an image based on the acquired high brightness HDR image data. A method of acquiring high brightness HDR image data is not particularly limited. In the present embodiment, high brightness HDR image data is distributed using a network and high brightness HDR image data is acquired via a LAN terminal or the like. A method of transmitting (distributing) high brightness HDR image data is also not particularly limited. In the present embodiment, two streams are transmitted as high brightness HDR image data. A main stream which is one of the two streams stores LDR image data and a sub stream which is the other of the two streams stores difference data and metadata.

LDR image data is image data (base image data) created by subjecting HDR image data to gradation compression (down-sampling). LDR image data is image data in which the number of bits representing a color depth is smaller than HDR image data. In the present embodiment, LDR image data is image data with a color depth of 8 bits.

Difference data is data related to a difference between HDR image data and LDR image data. As difference data, brightness difference data that is data related to a difference in brightness, color difference data that is data related to a difference in color, and the like can be used. Brightness difference data can also be described "data representing a correspondence relationship between a gradation value of LDR image data and a gradation value of HDR image data". While the number of bits in a value of difference data is not particularly limited, in the present embodiment, the number of bits in a value of difference data is 4 bits.

Brightness difference data is, for example, brightness ratio data, brightness conversion table data, or the like. Brightness ratio data is data representing a brightness ratio that is a ratio between a gradation value of LDR image data and a gradation value of HDR image data in pixel units (or units of a region constituted by a predetermined number of pixels). Brightness conversion table data is lookup table data that represents a correspondence relationship between an input gradation value and an output gradation value in a range expansion process for expanding a dynamic range of LDR image data. A range expansion process may also be described as a process for reproducing brightness that is not sufficiently expressed by LDR image data.

LDR image data is image data generated by, for example, performing a range reduction process (image processing for reducing a dynamic range of HDR image data) using a tone map. A tone map refers to lookup table data that represents a correspondence relationship between an input gradation value and an output gradation value in a range reduction process. In addition, the brightness conversion table data described above is lookup table data created by interchanging an input gradation value and an output gradation value of a tone map with each other. Therefore, brightness conversion table data can be referred to as an "inverse tone map".

Alternatively, brightness difference data may be data representing a brightness difference value that is a difference value obtained by subtracting one of a gradation value of LDR image data and a gradation value of HDR image data from the other in pixel units (or units of a region constituted by a predetermined number of pixels). As color difference data, various types of data can be used in a similar manner to brightness difference data.

Metadata stores brightness data related to brightness of a high brightness HDR image (an image represented by high brightness HDR image data). In a case where a high brightness HDR image is a moving image, for example, brightness data includes a change in brightness between frames, a change in brightness between scenes, maximum brightness of each frame, maximum brightness of each scene, and the like.

HDR image data can be generated by performing a range expansion process using LDR image data and difference data. In addition, by further using brightness data in a case of performing display using HDR image data, a dynamic range of an HDR image (an image represented by HDR image data) can be expanded and a high brightness HDR image can be displayed.

Figure 2:
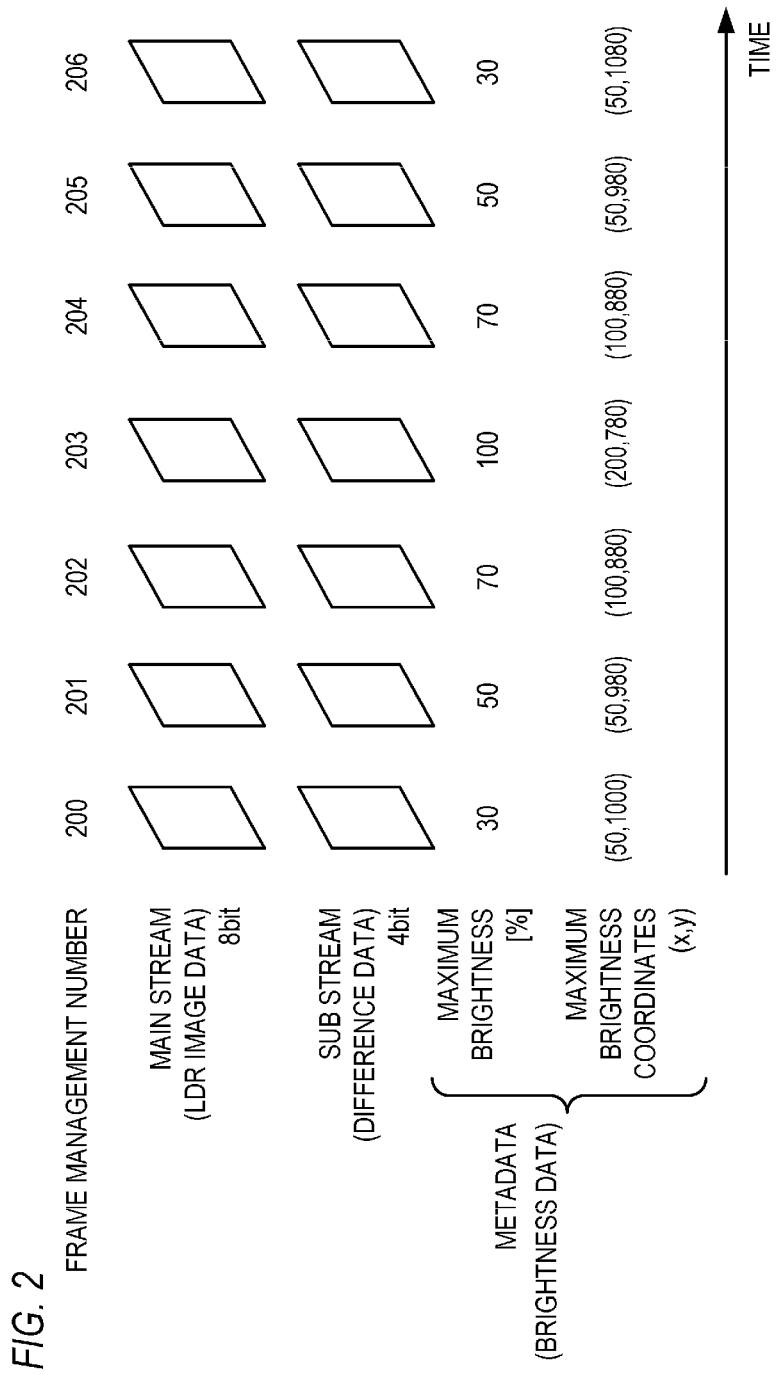
FIG. 2 is a diagram showing an example of high brightness HDR image data according to the first embodiment.

FIG. 2 is a diagram showing an example of high brightness HDR image data that is moving image data. FIG. 2 shows LDR image data as data of a main stream and difference data and metadata as data of a sub stream. As metadata, maximum brightness (a maximum value of brightness of a high brightness HDR image) of each frame and maximum brightness coordinates (coordinates of an image region having maximum brightness) of each frame are shown. In the present embodiment, a combination of maximum brightness and maximum brightness coordinates constitute brightness data. FIG. 2 shows, as maximum brightness, a proportion [%] of a maximum value of brightness of a high brightness HDR image with respect to an upper limit value of brightness of the high brightness HDR image. As maximum brightness coordinates, center coordinates (horizontal coordinate x, vertical coordinate y) of an image region having maximum brightness are shown. Data in the main stream is assigned a number indicating a frame corresponding to the data (a frame management number). A frame management number is used for, for example, attaining synchronization between a process with respect to the main stream and a process with respect to the sub stream. An example of a process with respect to the main stream or the sub stream is decoding.

Alternatively, a frame management number may be assigned to data in the sub stream or frame management numbers may be assigned to both data in the main stream and data in the sub stream. A unit of maximum brightness is not limited to [%]. A method of adding metadata is also not particularly limited. For example, metadata is added to difference data by encoding with a video codec such as H.264 (AVC) and H.265 (HEVC).

Moreover, while one maximum brightness value is associated with one frame in FIG. 2, a plurality of maximum brightness values may be associated with one frame. Let us now consider a case where a backlight unit includes a plurality of light sources respectively corresponding to a plurality of partial regions in a screen and, at the same time, emission brightness of the plurality of light sources can be individually controlled. A partial region refers to a region constituting a part of a screen. A plurality of partial regions are, for example, a plurality of divided regions constituting a region of a screen. In a case where a plurality of partial regions are known in advance, a plurality of maximum brightness values corresponding to the plurality of partial regions can be associated with one frame. Maximum brightness corresponding to a partial region is a maximum value of brightness of a high brightness HDR image in the partial region.

Moreover, metadata (brightness data) is not limited to the data shown in FIG. 2. For example, brightness data may include a size of an image region whose brightness equals maximum brightness. In a case where the number of display elements (the number of pixels) of the screen of the image display apparatus 100 is known in advance, brightness data can include the number of display elements of a screen region which displays an image region whose brightness equals maximum brightness.

As shown in FIG. 1, the image display apparatus 100 includes an HDR decoder 101, an HDR generating unit 102, an image processing unit 103, a liquid crystal panel 104, a characteristic value acquiring unit 105, a first BL control unit 106, a second BL control unit 107, a BL control selecting unit 108, a backlight unit 109, an operation receiving unit 110, a specific operation determining unit 111, and a reproduction control unit 112. While the respective functional units are connected to the reproduction control unit 112 using control buses, a part of the control buses are omitted in FIG. 1.

The respective functional units of the image display apparatus 100 will be described below in accordance with a processing flow of the image display apparatus 100. Hereinafter, an example of a case where moving image data is received as high brightness HDR image data will be described. In addition, hereinafter, an example of a case where a resolution of the received high brightness HDR image is full-HD (number of pixels in horizontal direction× number of pixels in vertical direction=1920 pixels×1080 pixels) will be described.

The HDR decoder 101 decodes the high brightness HDR image data received by a receiving unit (not shown). Specifically, the HDR decoder 101 respectively decodes a main stream and a sub stream (dual decoding). In addition, metadata has been added to the sub stream and, accordingly, the HDR decoder 101 further decodes the metadata. As a result, LDR image data, difference data, and brightness data are acquired. In this case, as the LDR image data, first moving image data in which a range of obtainable values of a gradation value is a first gradation range is acquired. As the difference data, data related to a difference between second moving image data in which a range of obtainable values of a gradation value is a second gradation range and first moving image data is acquired. The second gradation range is wider than the first gradation range and a maximum gradation value (a maximum value of gradation values) of the second gradation range is larger than a maximum gradation value of the first gradation range. The second moving image data is HDR image data. Moreover, a functional unit that performs a process of acquiring LDR image data (a first acquisition process), a functional unit that performs a process of acquiring difference data (a second acquisition process), and a functional unit that performs a process of acquiring brightness data (a third acquisition process) may be a same functional unit or may be different functional units.

The HDR generating unit 102 generates HDR image data (second moving image data) using the LDR image data and the difference data acquired by the HDR decoder 101 and outputs the generated HDR image data to the image processing unit 103. In addition, the HDR generating unit 102 calculates BL brightness of each frame based on the brightness data obtained by the HDR decoder 101 and outputs BL brightness data including calculated values of BL brightness to the reproduction control unit 112. In a case where brightness data includes a plurality of values respectively corresponding to a plurality of partial regions, a plurality of BL brightness values respectively corresponding to the plurality of partial regions are calculated. A method of calculating BL brightness will be described later. In a case where difference data is not obtained, the HDR generating unit 102 outputs the LDR image data to the image processing unit 103.

The image processing unit 103 applies predetermined image processing on image data output from the HDR generating unit 102 and outputs the image data having been subjected to the predetermined image processing to the liquid crystal panel 104. The predetermined image processing is, for example, an image quality enhancing process for enhancing image quality of image data. Image quality enhancing processes include a gamma conversion process, a color conversion process, a brightness conversion process, an edge enhancement process, and a blurring process. As the predetermined image processing, one type of image processing may be performed or a plurality of types of image processing may be performed. In the present embodiment, the image processing unit 103 only performs the predetermined image processing in a case where LDR image data is output from the HDR generating unit 102. In addition, in a case where HDR image data is output from the HDR generating unit 102, the image processing unit 103 outputs the HDR image data input to the image processing unit 103 without performing the predetermined image processing. Image data output from the image processing unit 103 can be described "target image data which is moving image data that is a reproduction target". Alternatively, the predetermined image processing may be omitted only in a case where an intention of the image creator is included as metadata.

The liquid crystal panel 104 reproduces (displays) an image based on target image data. In the present embodiment, a moving image is reproduced. The liquid crystal panel 104 includes a plurality of liquid crystal elements as a plurality of display elements. Transmittance of each liquid crystal element is controlled to a value in accordance with a gradation value of image data output from the image processing unit 103. In the present embodiment, the transmittance of each liquid crystal element is controlled to a value in accordance with a gradation value of 12 bits. In a case where LDR image data whose gradation value is an 8 bit-value is output from the image processing unit 103, 4 bits' worth of 0s are added to the end of the gradation value of the LDR image data. Accordingly, the number of bits of the gradation value of the LDR image data is converted from 8 bits to 12 bits. Subsequently, the transmittance of each liquid crystal element is controlled in accordance with the LDR image data after the number of bits has been converted. The image is reproduced (displayed) as light emitted from the backlight unit 109 passes through each liquid crystal element at transmittance in accordance with the image data.

The characteristic value acquiring unit 105 acquires a characteristic value (an image characteristic value) of each frame from the image data output from the HDR generating unit 102. For example, as the characteristic value, a maximum value, a minimum value, a mode, an intermediate value, an average value, or the like of brightness of the image represented by the image data is acquired. In a case where the backlight unit 109 includes a plurality of light sources corresponding to a plurality of partial regions, a plurality of characteristic values respectively corresponding to the plurality of partial regions may be acquired. A characteristic value corresponding to a partial region is a characteristic value of an image in the partial region. Subsequently, the characteristic value acquiring unit 105 outputs the acquired characteristic value to the first BL control unit 106.

Based on the characteristic value output by the characteristic value acquiring unit 105, the first BL control unit 106 generates a first BL control signal for controlling emission brightness of the backlight unit 109. For example, a signal for reducing emission brightness is generated as the first BL control signal in a case where an image represented by the image data output from the HDR generating unit 102 is dark and a signal for increasing emission brightness is generated as the first BL control signal in a case where the image represented by the image data output from the HDR generating unit 102 is bright. In a case where the backlight unit 109 includes a plurality of light sources corresponding to a plurality of partial regions, a plurality of first BL control signals respectively corresponding to the plurality of light sources are generated. The first BL control signal corresponding to a light source is a signal for controlling emission brightness of the light source. In the present embodiment, emission brightness is controlled by controlling a pulse width of a signal. For this reason, a PWM (Pulse Width Modulation) signal is generated as the first BL control signal. Moreover, a method of controlling emission brightness is not particularly limited. Emission brightness may be controlled by controlling a pulse amplitude of a signal or emission brightness may be controlled by controlling both a pulse width and a pulse amplitude of a signal.

Based on the BL brightness data output from the HDR generating unit 102, the second BL control unit 107 generates a second BL control signal for controlling emission brightness of the backlight unit 109. Brightness data obtained by the HDR decoder 101 may be used in place of BL brightness data. For example, a signal for controlling emission brightness to BL brightness represented by BL brightness data is generated as the second BL control signal. In the present embodiment, the second BL control signal is also a PWM signal. In a case where the backlight unit 109 includes a plurality of light sources corresponding to a plurality of partial regions, a plurality of second BL control signals respectively corresponding to the plurality of light sources are generated. For example, with respect to each of a plurality of partial regions, a second BL control signal corresponding to a light source of the partial region is generated from BL brightness corresponding to the partial region.

The BL control selecting unit 108 selects either the first BL control signal generated by the first BL control unit 106 or the second BL control signal generated by the second BL control unit 107 in accordance with an instruction from the reproduction control unit 112. Subsequently, the BL control selecting unit 108 outputs the selected BL control signal to the backlight unit 109.

The backlight unit 109 emits light at emission brightness in accordance with the BL control signal output from the BL control selecting unit 108. Specifically, the backlight unit 109 is turned on during a period in which a value of the BL control signal is a first value and the backlight unit 109 is turned off during a period in which the value of the BL control signal is a second value (<first value). Emission brightness of the backlight unit 109 is determined by a ratio (duty ratio) between a turned-on period and a turned-off period of the backlight unit 109 in one frame period. The backlight unit 109 includes one or more light sources. Each light source includes one or more light-emitting elements. As the light-emitting element, a light-emitting diode (LED), an organic EL element, a cold cathode tube, or the like can be used. In the present embodiment, a direct backlight unit is used as the backlight unit 109. A direct backlight unit includes a light source arranged in a region of a screen on a plane that is parallel to the screen. Moreover, the backlight unit 109 is not limited to a direct backlight unit. For example, an edge backlight unit may be used as the backlight unit 109. An edge backlight unit includes a light source arranged along a side of a screen on a plane that is parallel to the screen. In addition, as described earlier, the backlight unit 109 may include a plurality of light sources respectively corresponding to a plurality of partial regions. In this case, emission brightness of the plurality of light sources may be individually controllable. Individually controlling emission brightness of a plurality of light sources enables an image with higher contrast to be generated. Individual control of emission brightness of a plurality of light sources is referred to as "local dimming control".

The operation receiving unit 110 is a reception unit that receives user operations with respect to the image display apparatus 100. User operations are performed using, for example, a remote controller or an operating unit. The operation receiving unit 110 outputs an operation signal in accordance with the performed user operation to the specific operation determining unit 111. The operation receiving unit 110 accepts various user operations including a reproduction operation. A reproduction operation is a user operation related to a method of reproducing a moving image. In a case where a reproduction operation is performed, an image is reproduced by a reproduction method in accordance with the performed reproduction operation.

The specific operation determining unit 111 determines whether or not the performed user operation is a specific reproduction operation based on the operation signal output from the operation receiving unit 110 and the BL brightness data output from the HDR generating unit 102. Brightness data obtained by the HDR decoder 101 may be used in place of BL brightness data. The specific reproduction operation will be described later.

The reproduction control unit 112 controls processes of the respective functional units included in the image display apparatus 100.

Figures 3, 4:
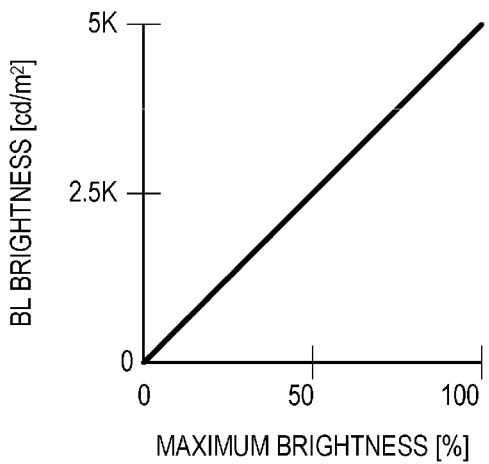
FIG. 3 is a diagram showing an example of a correspondence relationship between maximum brightness and BL brightness according to the first embodiment.
FIG. 4 is a diagram showing an example of a configuration of a backlight unit according to the first embodiment.

A specific example of a process by the HDR generating unit 102 will be described with reference to FIGS. 3 and 4. FIG. 3 shows an example of an LUT (Lookup Table) for converting maximum brightness stored in metadata (brightness data) into BL brightness. A horizontal axis in FIG. 3 represents maximum brightness [%] and a vertical axis in FIG. 3 represents BL brightness [cd/m$^2$]. An upper limit value of BL brightness is not particularly limited. As shown in FIG. 3, in the present embodiment, the upper limit value of BL brightness is set to 5000 [cd/m$^2$]. In a case of using the LUT shown in FIG. 3, maximum brightness 100 [%] is converted to BL brightness 5000 [cd/m$^2$] and maximum brightness 50 [%] is converted to BL brightness 2500 [cd/m$^2$]. In the case of frame management number 200 in FIG. 2, since maximum brightness is 30 [%], BL brightness 1500 [cd/m$^2$] is calculated by the HDR generating unit 102.

FIG. 4 is a diagram showing an example of a configuration of the backlight unit 109. Shaded squares in FIG. 4 depict light sources. The number or arrangement of light sources is not particularly limited. As shown in FIG. 4, in the present embodiment, the backlight unit 109 includes light sources expressed as number of light sources in horizontal direction× number of light sources in vertical direction=10× 6. In the present embodiment, since the resolution of a high brightness HDR image is full-HD, one light source corresponds to an image region expressed as number of pixels in horizontal direction× number of pixels in vertical direction=192 pixels×180 pixels. In the present embodiment, the HDR generating unit 102 calculates coordinates of a light source corresponding to an image region including maximum brightness coordinates stored in metadata (brightness data) as BL coordinates. In the present embodiment, coordinates of a top-left end pixel (display pixel) are (0, 0) and coordinates of a bottom-right end pixel are (1919, 1079). In addition, coordinates of a top-left end light source are (0, 0) and coordinates of a bottom-right end light source are (9, 5). In the case of frame management number 200 in FIG. 2, BL brightness coordinates (horizontal coordinate, vertical coordinate)=(50, 1000) (a point A in FIG. 4). Therefore, the HDR generating unit 102 calculates BL coordinates (horizontal coordinate, vertical coordinate)=(0, 5).

In the present embodiment, BL brightness data is generated which includes BL brightness and BL coordinates determined by the method described above. In addition, a second BL control signal is generated which causes a light source at the BL coordinates to emit light at the BL brightness and causes remaining light sources to emit light at a predetermined reference brightness.

Figure 5:
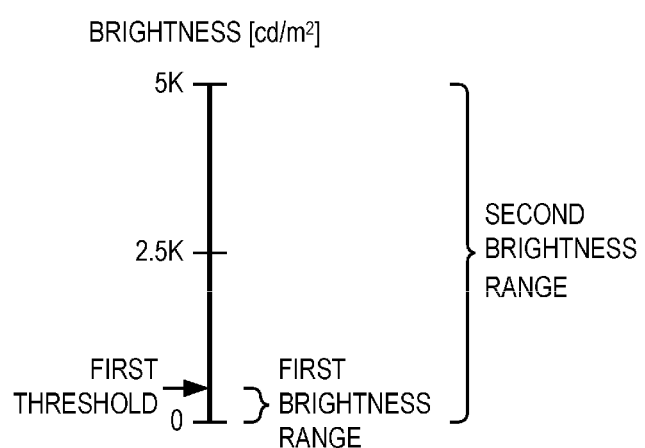
FIG. 5 is a diagram showing an example of a control range of emission brightness according to the first embodiment.

Next, specific examples of a control range of emission brightness by the first BL control unit 106 and a control range of emission brightness by the second BL control unit 107 will be described with reference to FIG. 5. A first threshold (500 [cd/m$^2$]) shown in FIG. 5 is compared with maximum brightness (BL brightness) in a process by the specific operation determining unit 111 (a determination on whether or not a user operation is a specific reproduction operation). FIG. 5 shows a range of 0 [cd/m$^2$] to 5000 [cd/m$^2$] as a range of obtainable values of brightness of a high brightness HDR image. A first brightness range is a range of emission brightness controlled by the first BL control unit 106 and a second brightness range is a range of emission brightness controlled by the second BL control unit 107. In FIG. 5, the first brightness range is a range from 0 [cd/m$^2$] to 500 [cd/m$^2$] and the second brightness range is a range from 0 [cd/m$^2$] to 5000 [cd/m$^2$]. In the present embodiment, emission brightness is controlled in the first brightness range in a case of reproducing an LDR image (an image represented by LDR image data) and an HDR image and emission brightness is controlled in the second brightness range in a case of reproducing a high brightness HDR image. Moreover, the first threshold may be higher or lower than 500 [cd/m$^2$]. The first threshold may be a fixed value set in advance by a manufacturer or a value that can be changed by the user. In addition, the first brightness range and the second brightness range may be set to any range as long as maximum emission brightness (a maximum value of emission brightness) of the second brightness range is higher than maximum emission brightness of the first brightness range. For example, the first brightness range may include only one emission brightness (such as 200 [cd/m$^2$]).

Figure 6:
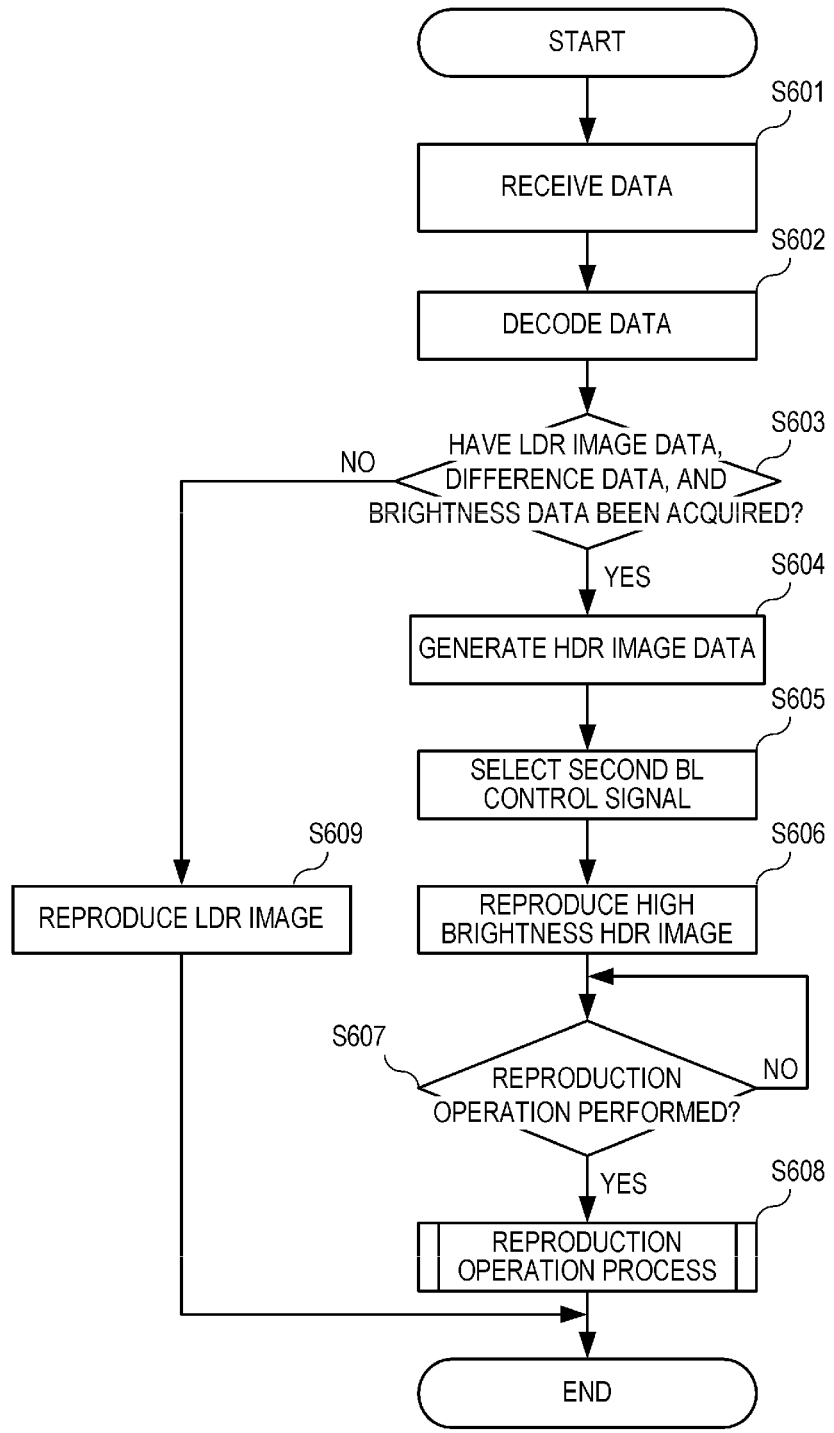
FIG. 6 is a flow chart showing an example of overall operations of the image display apparatus according to the first embodiment.

Next, operations of the image display apparatus 100 will be described with reference to the flow chart in FIG. 6. FIG. 6 is a flow chart showing an example of overall operations of the image display apparatus 100. The flow chart in FIG. 6 is started at a timing in a case where a state of the image display apparatus 100 becomes a state capable of receiving high brightness HDR image data.

First, in S601, the image display apparatus 100 receives a main stream and a sub stream. Next, in S602, the HDR decoder 101 decodes the main stream and the sub stream (including metadata) received in S601. Subsequently, in S603, the reproduction control unit 112 communicates with the HDR decoder 101 in order to determine whether or not LDR image data, difference data, and brightness data have been obtained. In a case where LDR image data, difference data, and brightness data have been obtained, the process is advanced to S604. Otherwise, the process is advanced to S609. Specifically, in a case where at least one of difference data and brightness data has not been obtained, the process is advanced to S609.

In S609, an LDR image is reproduced. Specifically, the HDR generating unit 102 outputs LDR image data, the image processing unit 103 applies predetermined image processing to the LDR image data, and transmittance of the liquid crystal panel 104 is controlled to a value in accordance with image data having been subjected to the predetermined image processing. In addition, the characteristic value acquiring unit 105 acquires a characteristic value from the LDR image data, the first BL control unit 106 generates a first BL control signal based on the characteristic value, and the BL control selecting unit 108 selects the first BL control signal. Furthermore, emission brightness of the backlight unit 109 is controlled to a value in accordance with the first BL control signal. Accordingly, an LDR image is reproduced (displayed).

In S604, the HDR generating unit 102 generates HDR image data using the LDR image data and the difference data obtained in S603 and outputs the generated HDR image data. A method (an algorithm) for generating HDR image data is not particularly limited. In addition, the HDR generating unit 102 generates BL brightness data from the brightness data obtained in S603 and outputs the generated BL brightness data. Subsequently, the second BL control unit 107 generates a second BL control signal based on the BL brightness data. Furthermore, the characteristic value acquiring unit 105 acquires a characteristic value from the LDR image data and the first BL control unit 106 generates a first BL control signal based on the characteristic value.

After S604, in S605, the BL control selecting unit 108 selects the second BL control signal. Subsequently, in S606, a high brightness HDR image is reproduced. Specifically, the HDR image data generated in S604 is input to the liquid crystal panel 104 and the transmittance of the liquid crystal panel 104 is controlled to a value in accordance with the HDR image data. In addition, the second BL control signal determined in S604 is input to the backlight unit 109 and emission brightness of the backlight unit 109 is controlled to a value in accordance with the second BL control signal. Accordingly, a high brightness HDR image is reproduced (displayed).

Next, in S607, the operation receiving unit 110 awaits a reproduction operation. In a case where a reproduction operation has been performed, the process is advanced to S608. Whether or not a reproduction operation has been performed can be determined by the reproduction control unit 112 by analyzing an operation signal from the operation receiving unit 110. In S608, a reproduction operation process is performed.

Figure 7:
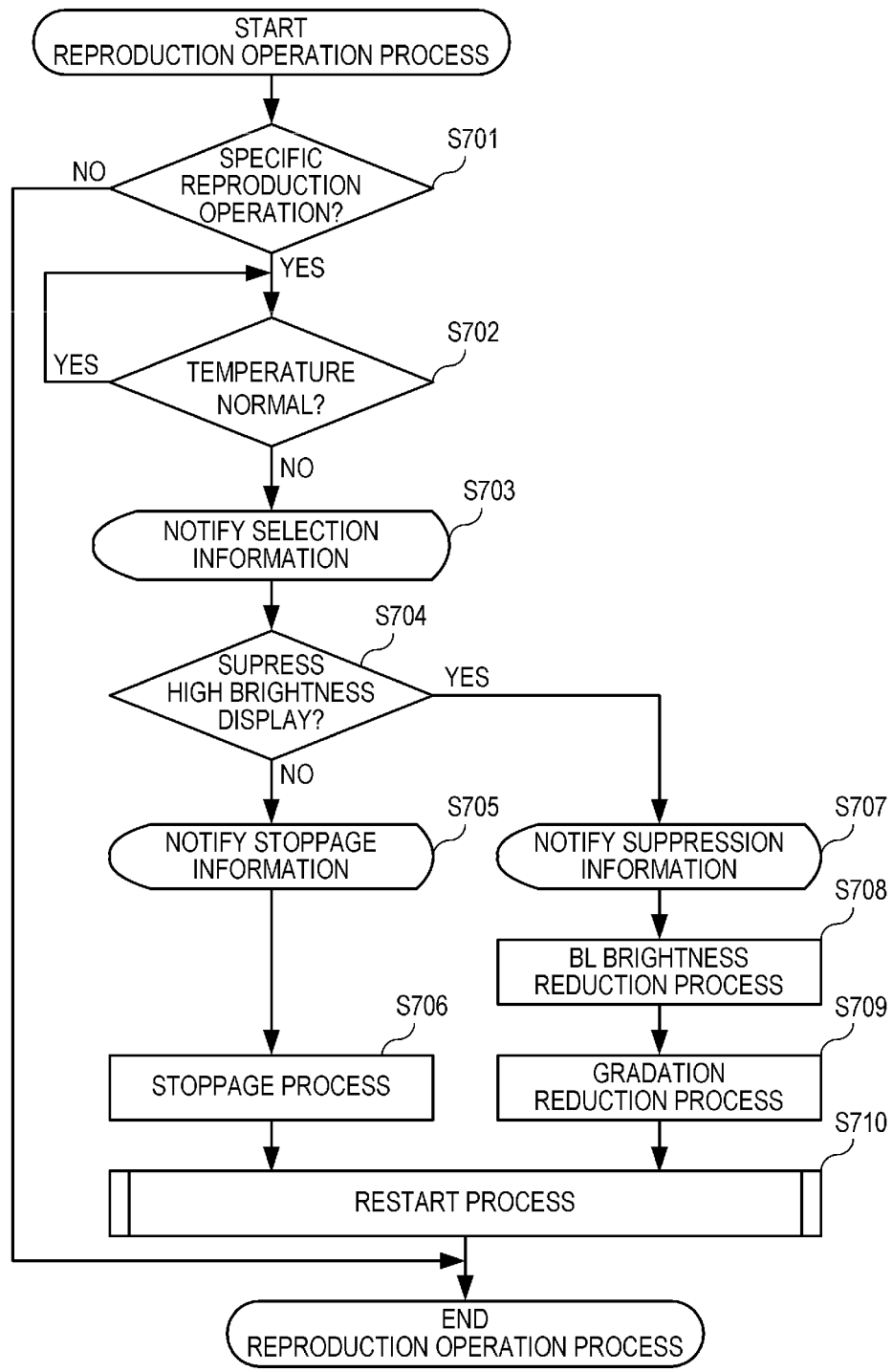
FIG. 7 is a flow chart showing an example of a reproduction operation process according to the first embodiment.

Next, the reproduction operation process (S608 in FIG. 6) will be described using the flow chart in FIG. 7. FIG. 7 is a flow chart showing an example of the reproduction operation process.

First, in S701, the specific operation determining unit 111 determines whether or not the reproduction operation performed in S607 in FIG. 6 is a specific reproduction operation. In the present embodiment, a first pause operation that is a pause operation performed during reproduction of a frame including an image region whose brightness is higher than a first threshold is detected as the specific reproduction operation. A pause operation is a reproduction operation for temporarily stopping the reproduction of the moving image. Specifically, the reproduction control unit 112 acquires BL brightness data of a frame or a scene that is currently being reproduced from the HDR generating unit 102 and outputs the acquired BL brightness data to the specific operation determining unit 111. In addition, the reproduction control unit 112 determines whether or not the reproduction operation performed in S607 is a pause operation by analyzing the operation signal obtained in S607 and outputs a result of the determination to the specific operation determining unit 111. Alternatively, the determination of the reproduction operation (the determination on whether or not the reproduction operation is a pause operation) may be performed in S607. Subsequently, the specific operation determining unit 111 compares BL brightness indicated by the BL brightness data with the first threshold. In addition, the specific operation determining unit 111 determines whether or not the reproduction operation performed in S607 is the first pause operation in accordance with the result of determination of the BL brightness and the result of determination of the reproduction operation.

In a case where the reproduction operation is a pause operation and, at the same time, the BL brightness is higher than the first threshold, the reproduction operation performed in S607 is determined as the first pause operation and the process is advanced to S702. Otherwise, the reproduction operation performed in S607 is determined not to be the first pause operation, the present flow chart is ended, and a high brightness HDR image is reproduced by a reproduction method in accordance with the reproduction operation performed in S607.

In the present embodiment, the image display apparatus 100 includes a temperature sensor (not shown) which measures temperature inside the image display apparatus 100. The temperature sensor measures, for example, temperature of the backlight unit 109. In S702, the reproduction control unit 112 monitors a measurement value of the temperature sensor and determines whether or not the temperature inside the image display apparatus 100 is normal based on the measurement value of the temperature sensor.

The upper limit value of brightness of a high brightness HDR image in the present embodiment is set to 5000 [$cd/m^2$]. In a case where the backlight unit 109 continues to emit light at emission brightness of 5000 [$cd/m^2$], the temperature of the backlight unit 109 rises and may cause the image display apparatus 100 to malfunction or may cause the image display apparatus 100 to break down. Since display at a high brightness over an extended period of time is not favorable in terms of visual recognition of images by a user, brightness data that maintains high brightness is not stored in metadata. Therefore, in a case where normal reproduction (reproduction at a normal (reference) reproduction speed and a normal (reference) image magnification) of a high brightness HDR image is being performed, the backlight unit 109 does not continue to emit light at emission brightness of 5000 [$cd/m^2$]. However, in a case where a reproduction operation is performed, the backlight unit 109 may continue to emit light at high emission brightness.

In a case where the measurement value of the temperature sensor (the temperature inside the image display apparatus 100) is larger than a third threshold, a determination is made that the temperature inside the image display apparatus 100 is not normal and the process is advanced to S703. In a case where the measurement value of the temperature sensor is equal to or smaller than the third threshold, a determination is made that the temperature inside the image display apparatus 100 is normal. The process of S702 is repeated until a determination that the temperature inside the image display apparatus 100 is not normal is made. By switching processes in accordance with the temperature inside the image display apparatus 100, malfunctions and failures of the image display apparatus 100 can be suppressed. Moreover, the third threshold may be a fixed value set in advance by a manufacturer or a value that can be changed by the user.

In S703, the reproduction control unit 112 notifies the user of selection information which asks the user to select either one of stoppage of reproduction of the moving image and suppression of display at high brightness. For example, the user is notified of selection information by displaying an image representing the selection information on the screen. Alternatively, the user may be notified of selection information and temperature information indicating that the temperature inside the image display apparatus 100 is high.

Next, in S704, the reproduction control unit 112 determines whether a user operation for selecting stoppage of reproduction of the moving image has been performed or a user operation for selecting suppression of display at high brightness has been performed. In a case where a user operation for selecting stoppage of reproduction of the moving image has been performed, the process is advanced to S705, and in a case where a user operation for selecting suppression of display at high brightness has been performed, the process is advanced to S707.

In S705, the reproduction control unit 112 notifies the user of stoppage information which indicates that reproduction of the moving image is to be stopped. For example, the user is notified of stoppage information by image display in a similar manner to selection information. Subsequently, in S706, the reproduction control unit 112 performs a stoppage process for stopping reproduction of the moving image based on target image data. Specifically, the reproduction control unit 112 instructs the HDR generating unit 102 to stop output of data necessary for reproducing the image. Accordingly, output of data from the HDR generating unit 102 is stopped and reproduction of the image is stopped.

In S707, the reproduction control unit 112 notifies the user of suppression information which indicates that display at high brightness is to be suppressed. For example, the user is notified of suppression information by image display in a similar manner to selection information. Subsequently, in S708 and S709, the reproduction control unit 112 performs a control process in which reproduction is controlled so that reproduction of an image with brightness higher than the first threshold is suppressed. In the present embodiment, a reduction process in which brightness of the reproduced moving image is reduced is performed as the control process.

In S708, the reproduction control unit 112 instructs the BL control selecting unit 108 to select the first BL brightness signal. Accordingly, an output signal of the BL control selecting unit 108 is changed from the second BL brightness signal to the first BL brightness signal. In other words, a range of obtainable values of emission brightness of the backlight unit 109 is changed from the second brightness range to the first brightness range. As a result, the emission brightness of the backlight unit 109 is reduced. Moreover, a method of the BL brightness reduction process for reducing the emission brightness of the backlight unit 109 is not particularly limited. For example, the output signal of the BL control selecting unit 108 may be changed from the second BL brightness signal to the first BL brightness signal in stages over a period of time corresponding to a plurality of frames. Alternatively, the emission brightness of the backlight unit 109 may be reduced to a value that is lower than the emission brightness corresponding to the second BL brightness signal by a predetermined value. A range of obtainable values of emission brightness after the reduction may differ from the first brightness range.

In S709, the reproduction control unit 112 instructs the HDR generating unit 102 to output LDR image data. Accordingly, target image data that is output data of the HDR generating unit 102 is changed from HDR image data to LDR image data. In other words, a range of obtainable values of a gradation value of the target image data is changed from the second gradation range to the first gradation range. As a result, the gradation value of the target image data is reduced. Moreover, a method of the gradation reduction process for reducing the gradation value of the target image data is not particularly limited. For example, the target image data may be changed from HDR image data to LDR image data in stages over a period of time corresponding to a plurality of frames. Alternatively, the gradation value of the target image data may be reduced to a value that is lower than the gradation value of the target image data by a predetermined value. A range of obtainable values of the gradation value after the reduction may differ from the first gradation range.

Due to the reduction processes (the BL brightness reduction process and the gradation reduction process) described above, an LDR image is reproduced.

A process of S710 is performed following the process of S706 or S709. In S710, the reproduction control unit 112 performs a restart process for restarting reproduction of a high brightness HDR image.

Moreover, the temperature inside the image display apparatus 100 need not be considered. For example, the process may be advanced from S701 to S707 in a case where a specific reproduction operation is performed.

Next, the restart process (S710 in FIG. 7) will be described using the flow chart in FIG. 8. FIG. 8 is a flow chart showing an example of the restart process.

First, in S801, the operation receiving unit 110 awaits a restart operation which is a user operation for instructing restart of reproduction of a high brightness HDR image. In a case where a restart operation is performed, processes of S802 and thereafter are performed. A restart operation can also be described as "a user operation for starting normal reproduction". A restart operation after the process of S709 is performed can also be described as "a user operation for canceling reproduction by a reproduction method in accordance with the specific reproduction operation (the first pause operation)". In the present embodiment, a restart operation after the process of S709 is "a user operation for canceling reproduction by a reproduction method in accordance with the first pause operation".

In S802, the reproduction control unit 112 detects a frame (a low brightness frame) which does not include an image region of a high brightness HDR image whose brightness is higher than the first threshold. In the present embodiment, a frame whose BL brightness (maximum brightness) is equal to or lower than the first threshold is detected among a plurality of frames preceding a current reproduction frame (a frame currently being reproduced). Specifically, a leading frame of a period of N-number of frames (a period corresponding to N-number of frames (where N is an integer equal to or larger than 2)) whose BL brightness is equal to or lower than the first threshold is detected. Moreover, the value of N is not particularly limited. The value of N may be a value set in advance by a manufacturer or a value that can be changed by the user. Alternatively, the value of N may be determined based on the temperature inside the image display apparatus 100.

Subsequently, in S803, the reproduction control unit 112 performs control for restarting reproduction (normal reproduction) of a high brightness HDR image. In doing so, the reproduction control unit 112 switches a frame that is a reproduction target to the frame detected in S802 (a first switching process). As a result, a high brightness HDR image is reproduced from the frame detected in S802. A high brightness HDR image is reproduced by using HDR image data and the second BL control signal.

Next, in S804, the reproduction control unit 112 determines whether or not an elapsed time after restart of normal reproduction has reached a threshold time. The process of S804 is repetitively performed until the elapsed time reaches the threshold time, and the present flow chart is ended once the elapsed time reaches the threshold time. In addition, the reproduction control unit 112 disables reproduction operations during a period between the restart of normal reproduction and the lapse of the threshold time. Accordingly, reproduction operations cannot be accepted by the operation receiving unit 110 during the period between the restart of normal reproduction and the lapse of the threshold time. As a result, a frequency of control processes can be reduced and a sense of discomfort (a sense of discomfort caused by a change in display due to the control process) which is felt by the user can be reduced. Moreover, the threshold time may be a fixed time set in advance by a manufacturer or a time that can be changed by the user.

Moreover, a method of performing the process of S802 is not particularly limited. For example, a frame preceding the current reproduction frame may be detected or a frame subsequent to the current reproduction frame may be detected. A frame that is temporally nearest to the current reproduction frame may be detected among the plurality of frames not including an image region whose brightness is higher than the first threshold. As the plurality of frames, only frames preceding the current reproduction frame may be used or only frames subsequent to the current reproduction frame may be used. As the plurality of frames, both frames preceding the current reproduction frame and frames subsequent to the current reproduction frame may be used. However, frames preceding the current reproduction frame are favorably detected. Accordingly, the user can be prevented from overlooking a frame. In addition, a leading frame of a period of N-number of frames which do not include an image region whose brightness is higher than the first threshold is favorably detected. Accordingly, a high brightness frame can be more reliably prevented from being immediately displayed. Furthermore, a frame that is temporally nearest to the current reproduction frame is favorably detected. Accordingly, a sense of discomfort that is felt by the user by switching frames that are reproduction targets can be reduced.

Figure 11:
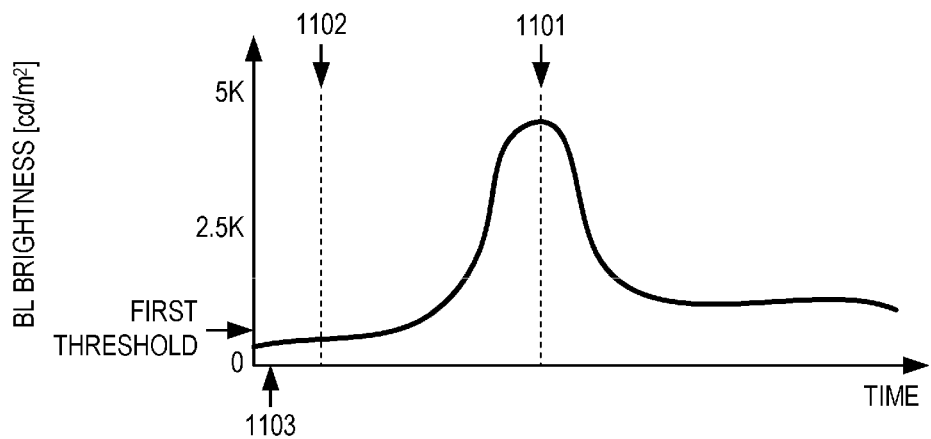
FIG. 11 is a diagram showing a specific example of the restart process according to the first embodiment.

A specific example of the restart process will be described with reference to FIG. 11. A vertical axis in FIG. 11 represents maximum brightness (BL brightness) [cd/m$^2$] of a high brightness HDR image and a horizontal axis in FIG. 11 represents time. An example where a pause operation is performed during reproduction of frame 1101 and a restart process is subsequently performed will now be described.

With conventional image display apparatuses, reproduction is restarted from a frame which was reproduced at the time of pause. However, in a case where reproduction is restarted from a frame or a scene with high brightness, excessive brightness of the display may inhibit visual recognition of images by the user. In consideration thereof, in the present embodiment, reproduction is restarted from frame 1102 which is a leading frame of a period of N-number of frames whose BL brightness is equal to or lower than the first threshold. Accordingly, restart of reproduction from a frame or a scene with high brightness can be suppressed.

Moreover, a control process may be continuously performed even after a restart process and the control process may be canceled at an appropriate scene. An example of an appropriate scene is a scene in the period of N-number of frames described above. The reproduction control unit 112 detects the appropriate scene by, for example, pre-reading BL brightness (maximum brightness) of frames subsequent to the current reproduction frame. Normal reproduction may be restarted from frame 1103 in FIG. 11, in which case LDR images may be reproduced during a period from frame 1103 to frame 1102 and the reproduced image may be switched from an LDR image to a high brightness HDR image at a timing of frame 1102. Alternatively, reproduction may be controlled so that a transition of the reproduced image from an LDR image to a high brightness HDR image is made in stages after the restart process.

Moreover, while an example where frames that are reproduction targets are not switched during a pause operation but frames that are reproduction targets are switched during a restart process has been described in the present embodiment, this example is not restrictive. Frames that are reproduction targets may be switched during a pause operation. For example, in a case where the first pause operation is performed, the reproduction control unit 112 may switch the frame that is a reproduction target to a frame that does not include an image region whose brightness is higher than the first threshold (a second switching process). A frame after switching by the second switching process is not particularly limited in a similar manner to a frame after switching by the first switching process.

Moreover, while an example in which the specific reproduction operation is the first pause operation has been described in the present embodiment, the specific reproduction operation is not limited thereto. For example, the specific reproduction operation may include at least any of the second pause operation, a first scaling operation, a second scaling operation, and a speed changing operation. The specific reproduction operation may not include the first pause operation.

The second pause operation is a pause operation performed during reproduction of a frame including an image region whose brightness is higher than the first threshold and whose size is larger than a second threshold. FIG. 9 is a diagram showing an example of the second threshold. A vertical axis in FIG. 9 represents the second threshold [cd/m$^2$] and a horizontal axis in FIG. 9 represents a size (number of pixels) of an image region having maximum brightness. FIG. 9 shows, as the second threshold, a value that decreases as the size of an image region having maximum brightness increases. This is because the smaller the size of a high brightness image region, the more prominent the brightness of the image region. In the BL brightness reduction process, emission brightness of the backlight unit may be reduced by reducing BL brightness to the second threshold. In a case where the second pause operation is performed, the frame that is a reproduction target may be switched to a frame that does not include an image region whose brightness is higher than the first threshold and whose size is larger than the second threshold (a fourth switching process). The frame that is a reproduction target may be switched in the restart process to a frame that does not include an image region whose brightness is higher than the first threshold and whose size is larger than the second threshold (a third switching process).

Moreover, a frame after switching by the third switching process or the fourth switching process is not particularly limited in a similar manner to a frame after switching by the first switching process. In addition, the second threshold is not limited to the value shown in FIG. 9. A value that is not dependent on the size of an image region having maximum brightness may be used as the second threshold. The second threshold may be a fixed value set in advance by a manufacturer or a value that can be changed by the user.

Moreover, a control process in a case where the first pause operation or the second pause operation is performed is not particularly limited. For example, reproduction of a high brightness image can be suppressed by performing at least any of the gradation reduction process, the BL brightness reduction process, the first switching process, and the second switching process as the control process.

The first scaling operation is a reproduction operation for changing an image size of target image data so that an image including an image region whose brightness is higher than the first threshold is reproduced. The second scaling operation is a reproduction operation for changing an image size of target image data so that an image including an image region whose brightness is higher than the first threshold and whose size is larger than the second threshold is reproduced. Scaling operations for changing an image size include an enlargement operation for enlarging an image and a reduction operation for reducing an image. In addition, scaling operations also include user operations for PbyP (Picture By Picture) display and PinP (Picture In Picture) display. In a case where the first scaling operation or the second scaling operation is performed, for example, at least one of the gradation reduction process and the BL brightness reduction process is performed as the control process.

A speed changing operation is a reproduction operation for changing a reproduction speed of a moving image based on target image data. Speed changing operations include a slow reproduction operation for reducing reproduction speed, reproduction operations for increasing reproduction speed (a fast forward operation and a fast rewind operation), and the like. In a case where a speed changing operation is performed, for example, at least one of the gradation reduction process and the BL brightness reduction process is performed as the control process. In a case where a speed changing operation is performed, a gradation value of image data or emission brightness of the backlight unit may be reduced by a reduction amount in accordance with the reproduction speed after the change.

Figure 10:
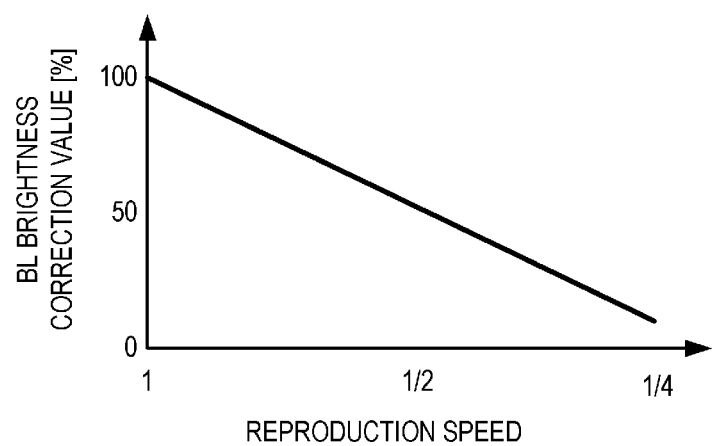
FIG. 10 is a diagram showing an example of a BL brightness correction value according to the first embodiment.

FIG. 10 shows an example of a BL brightness correction value in a case where a slow reproduction operation is performed. A vertical axis in FIG. 10 represents a BL brightness correction value and a horizontal axis in FIG. 10 represents reproduction speed. The BL brightness correction value is used in the BL brightness reduction process. The BL brightness correction value is a correction value that corrects BL brightness. FIG. 10 shows a multiplier value by which BL brightness is to be multiplied as the BL brightness correction value. Moreover, the BL brightness correction value is not limited to a multiplier value. For example, an added value to be added to BL brightness may be used as the BL brightness correction value. In FIG. 10, reproduction speed 1 denotes a normal reproduction speed. Therefore, the slow reproduction operation is a reproduction operation for reducing the reproduction speed to a value smaller than 1. In the example shown in FIG. 10, a BL brightness correction value that is smaller than 1 (100 [%]) is associated with a reproduction speed that is smaller than 1. In addition, since the slower the reproduction speed, the more likely that display at a high brightness is to be performed over a long period of time, a BL brightness correction value is associated with reproduction speed such that the slower the reproduction speed, the smaller the BL brightness correction value.

In a case where a slow reproduction operation is performed, BL brightness is reduced using a BL brightness correction value that corresponds to the reproduction speed after change (BL brightness reduction process). In the example shown in FIG. 10, a BL brightness correction value of 50% is associated with a reproduction speed of ½. Therefore, in a case where a slow reproduction operation for reducing the reproduction speed from 1 to ½ is performed, BL brightness of 5000 [cd/m$^2$] is reduced to 2500 [cd/m$^2$].

A brightness adjustment operation for adjusting brightness of a reproduced image may be performed as a user operation other than a reproduction operation. For example, in a case where the user visually recognizes a reproduced image from up close, the user is more sensitive to brightness as compared to a case where the user visually recognizes the reproduced image from afar. Therefore, a brightness adjustment operation may be performed in a case where the user visually recognizes a reproduced image from up close. In a case where a brightness adjustment operation is performed, a gradation value of image data or emission brightness of the backlight unit may be reduced by a reduction amount in accordance with the brightness adjustment operation. For example, BL brightness may be reduced using a BL brightness correction value in accordance with the brightness adjustment operation.

As described above, according to the present embodiment, in a case where a specific reproduction operation is performed, reproduction is controlled so as to suppress reproduction of an image whose brightness is higher than a first threshold. Accordingly, a favorable image can be reproduced in a more reliable manner in a case where various reproduction operations are performed. Specifically, display at prominently high brightness, display at high brightness over a long period of time, and the like can be prevented from being performed.

Moreover, while an example where LDR image data, difference data, and brightness data are received has been described in the present embodiment, the example is not restrictive. For example, HDR image data and brightness data may be received. Alternatively, high brightness HDR image data may be received in a single stream. In addition, a method of acquiring the various types of data is not particularly limited. For example, brightness data need not be stored in metadata. Three streams including a stream storing LDR image data, a stream storing difference data, and a stream storing brightness data may be received.

Second Embodiment

Hereinafter, an image reproduction apparatus and an image reproduction method according to a second embodiment of the present invention will be described. In the present embodiment, an example will be described in which control information that is information related to a correspondence relationship between a reproduction operation and a control method of reproduction is further acquired.

Figure 12:
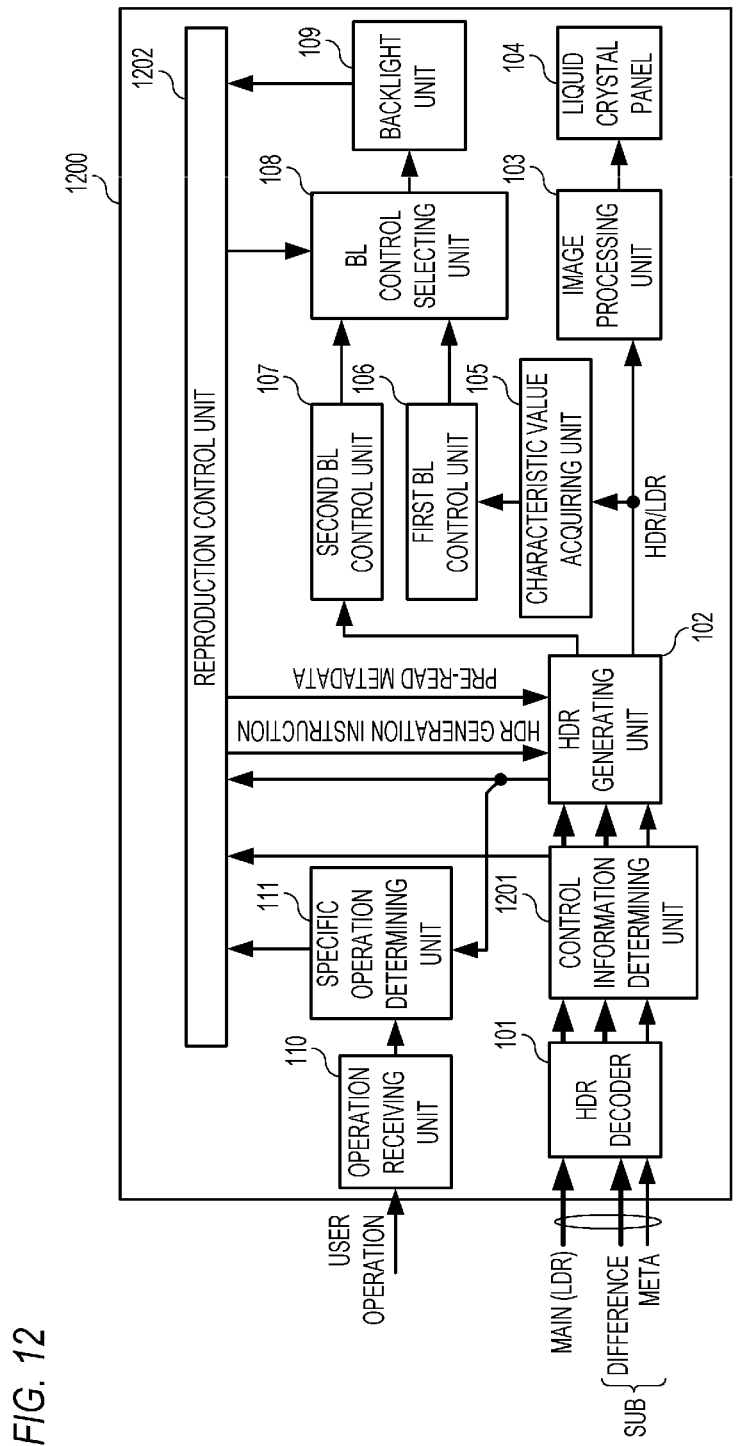
FIG. 12 is a block diagram showing an example of a functional configuration of an image display apparatus according to a second embodiment.

FIG. 12 is a block diagram showing an example of a functional configuration of an image display apparatus (image reproduction apparatus) 1200 according to the present embodiment. In FIG. 12, same functional units as in the first embodiment (FIG. 1) are assigned same reference characters as in the first embodiment and descriptions thereof will be omitted. As shown in FIG. 12, the image display apparatus 1200 includes a control information determining unit 1201 between the HDR decoder 101 and the HDR generating unit 102. In addition, the image display apparatus 1200 includes a reproduction control unit 1202 in place of the reproduction control unit 112 shown in FIG. 1.

The control information determining unit 1201 acquires a decoding result (data obtained by decoding) of the HDR decoder 101. In the present embodiment, metadata may include control information. In a case where metadata includes control information, the HDR decoder 101 acquires the control information by decoding the metadata (a fourth acquisition process). The control information determining unit 1201 determines whether or not control information has been acquired and outputs a determination result to the reproduction control unit 1202.

Moreover, a functional unit that performs the first acquisition process, a functional unit that performs the second acquisition process, a functional unit that performs the third acquisition process, and a functional unit that performs the fourth acquisition process may be a same functional unit or may be different functional units. A method of acquiring control information is not particularly limited. Control information need not be stored in metadata. Four streams including a stream storing LDR image data, a stream storing difference data, a stream storing brightness data, and a stream storing control information may be received.

The reproduction control unit 1202 has a similar function to the reproduction control unit 112. However, in the present embodiment, in a case where control information is acquired, the reproduction control unit 1202 controls reproduction according to the acquired control information.

FIG. 13 is a diagram showing an example of control information. In FIG. 13, three types of information listed below are associated with each of a plurality of reproduction operations. Using such control information enables an image creator or a user to set or change, as appropriate, processes performed by the image display apparatus in accordance with user operations.

Permission information indicating whether or not to permit a reproduction operation First control information indicating a control method of reproduction in a case where a reproduction operation is performed Second control information indicating a control method of reproduction in a case of restarting normal reproduction Moreover, control information is not limited to the information described above. For example, control information may not include at least any of permission information, first control information, and second control information. Control information may only include permission information. Control information may include information other than the three types of information (permission information, first control information, and second control information) described above. In addition, control information may be information in moving image units, information in frame units, information in scene units, or information in GOP (Group of Picture) units. Control information may be information indicating a control method of reproduction only for a specific reproduction operation.

Figure 14:
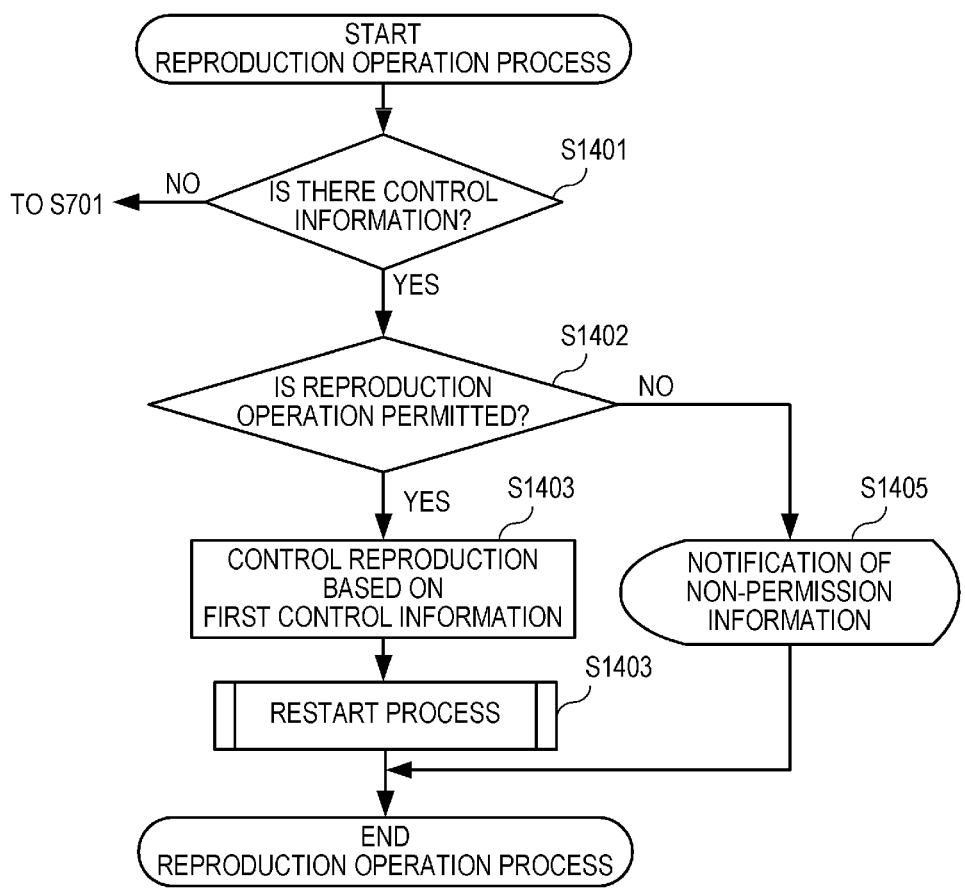
FIG. 14 is a flow chart showing an example of a reproduction operation process according to the second embodiment.

A flow chart of overall operations of the image display apparatus 100 is similar to that of the first embodiment (FIG. 6). Next, the reproduction operation process (S608 in FIG. 6) according to the present embodiment will be described using the flow chart in FIG. 14. FIG. 14 is a flow chart showing an example of the reproduction operation process according to the present embodiment.

First, in S1401, the control information determining unit 1201 determines whether or not control information has been obtained in S602 in FIG. 6. The process is advanced to S1402 in a case where control information has been obtained, but the process is advanced to S701 in FIG. 7 in a case where control information has not been obtained. In a case where control information has not been obtained, the present flow chart may be ended and a high brightness HDR image may be reproduced by a reproduction method in accordance with the reproduction operation performed in S607.

In S1402, the reproduction control unit 1202 determines whether or not the reproduction operation performed in S607 is permitted based on the control information (permission information) obtained in S602. The process is advanced to S1403 in a case where the reproduction operation is permitted, but the process is advanced to S1405 in a case where the reproduction operation is not permitted. In S1405, the reproduction control unit 1202 notifies the user of non-permission information which indicates that the reproduction operation performed in S607 is not permitted. For example, the user is notified of non-permission information by displaying an image representing the non-permission information on the screen. Subsequently, the present flow chart is ended.

In the control information shown in FIG. 13, a pause operation, a slow reproduction operation, a fast forward operation, a fast rewind operation, an enlargement operation, and a reduction operation are permitted while a brightness adjustment operation is prohibited. Therefore, in a case where a pause operation, a slow reproduction operation, a fast forward operation, a fast rewind operation, an enlargement operation, or a reduction operation is performed, the process is advanced from S1402 to S1403, and in a case where a brightness adjustment operation is performed, the process is advanced from S1402 to S1405.

In S1403, the reproduction control unit 1202 controls reproduction based on the control information (first control information) obtained in S602.

In FIG. 13, the first control information of a pause operation indicates that display of a high brightness HDR image is to be prioritized and reproduction is to be stopped in a case where display of the high brightness HDR image cannot be maintained. "The case where display of the high brightness HDR image cannot be maintained" signifies that, for example, temperature inside the image display apparatus 1200 is not normal. Therefore, in a case where a pause operation is performed, display of a high brightness HDR image is performed. In addition, reproduction is stopped in a case where it is determined that the temperature inside the image display apparatus 1200 is not normal.

In addition, in FIG. 13, the first control information of a slow reproduction operation indicates that maximum brightness (BL brightness) is to be reduced by 30%. Therefore, in a case where a slow reproduction operation is performed, a BL brightness reduction process for reducing BL brightness by 30% is performed. First control information of a fast forward operation and a fast rewind operation indicates that a range of obtainable values of emission brightness of the backlight unit 109 is to be switched from the second brightness range to the first brightness range. Therefore, in a case where a fast forward operation or a fast rewind operation is performed, a BL brightness reduction process for switching an output signal of the BL control selecting unit 108 from the second BL brightness signal to the first BL brightness signal is performed.

In addition, in FIG. 13, the first control information of an enlargement operation indicates that maximum brightness (BL brightness) is to be reduced in accordance with an enlargement rage of an image. Therefore, in a case where an enlargement operation is performed, a BL brightness reduction process for reducing BL brightness in accordance with the enlargement rate is performed. A method of reducing BL brightness using an enlargement rate is not particularly limited. For example, BL brightness may be reduced using a BL brightness correction value corresponding to the enlargement rate. Information indicating a correspondence relationship between an enlargement rate and a BL brightness correction value may be included in control information or may be recorded in the image display apparatus 1200 in advance. First control information of a reduction operation indicates that an LDR image is to be reproduced. Therefore, in a case where a reduction operation is performed, a BL brightness reduction process for switching an output signal of the BL control selecting unit 108 from the second BL brightness signal to the first BL brightness signal is performed. Furthermore, a gradation reduction process for switching output data of the HDR generating unit 102 from HDR image data to LDR image data is performed.

Moreover, in a case of stopping reproduction or suppressing display at high brightness, the user may be notified of stoppage information or suppression information (S705 and S707 in FIG. 7).

A process of S1404 is performed following the process of S1403. In S1404, the reproduction control unit 1202 performs a restart process for restarting reproduction of a high brightness HDR image.

Figure 15:
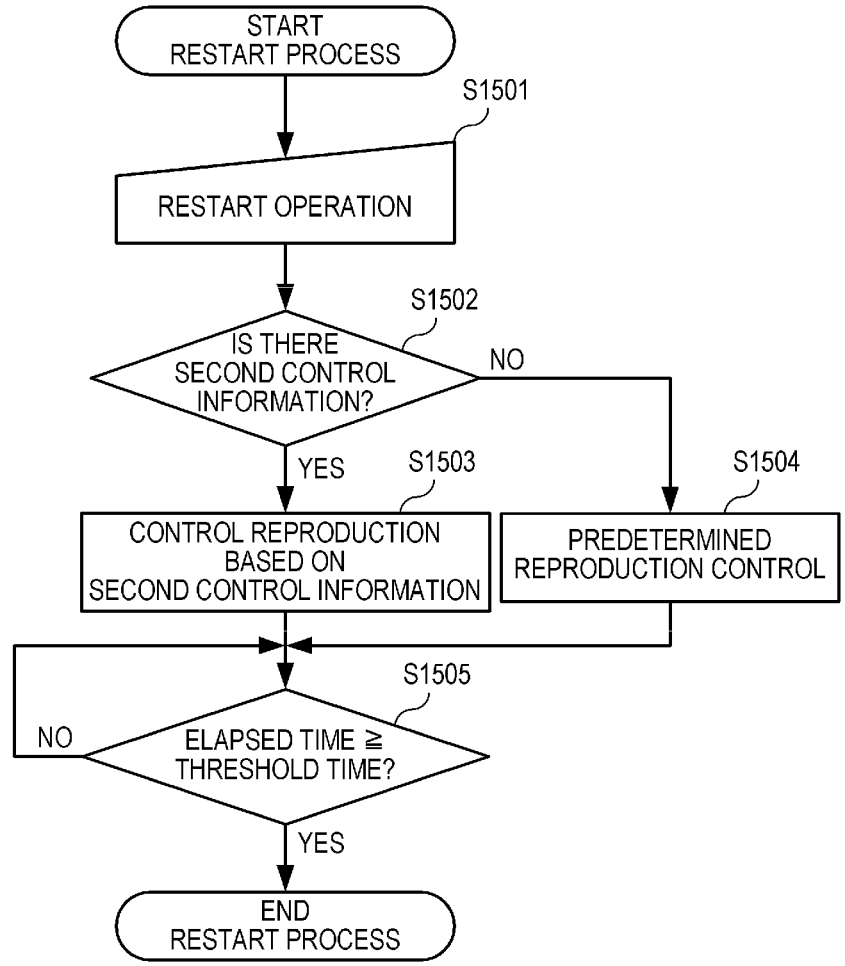
FIG. 15 is a flow chart showing an example of a restart process according to the second embodiment.

Next, the restart process (S1404 in FIG. 14) according to the present embodiment will be described using the flow chart in FIG. 15. FIG. 15 is a flow chart showing an example of the restart process according to the present embodiment.

First, in S1501, the operation receiving unit 110 awaits a restart operation. In a case where a restart operation is performed, processes of S1502 and thereafter are performed. In S1502, the reproduction control unit 1202 determines whether or not second control information corresponding to the reproduction operation performed in S607 is included in control information based on the determination result of S1401. The process is advanced to S1503 in a case where the second control information is included in the control information, but the process is advanced to S1504 in a case where the second control information is not included in the control information.

In S1503, the reproduction control unit 1202 controls reproduction based on the control information (second control information) obtained in S602. Subsequently, a process of S1505 is performed. The process of step S1505 is the same as the process of step S804 shown in FIG. 8.

In FIG. 13, the second control information of a pause operation indicates that a high brightness HDR image is to be reproduced from a leading frame of a period of N-number of frames whose BL brightness is equal to or lower than the first threshold. Therefore, in a case where a restart operation is performed after the pause operation, processes similar to the processes of S802 and S803 in FIG. 8 are performed.

In addition, in FIG. 13, the second control information of a slow reproduction operation, a fast forward operation, a fast rewind operation, an enlargement operation, and a reduction operation indicates that a range of obtainable values of emission brightness of the backlight unit 109 is to be brought closer to the second brightness range in stages. Therefore, in a case where a restart operation is performed after a slow reproduction operation, a fast forward operation, a fast rewind operation, an enlargement operation, or a reduction operation, a process is performed in order to bring the output signal of the BL control selecting unit 108 closer to the second BL brightness signal from the first BL brightness signal in stages. Furthermore, in a case where a restart operation is performed after an enlargement operation or a reduction operation, a process for switching output data of the HDR generating unit 102 from LDR image data to HDR image data is also performed.

In S1504, the reproduction control unit 1202 controls reproduction by a predetermined method so that normal reproduction of a high brightness HDR image is performed. Moreover, in a case where the flow chart shown in FIG. 7 is executed, the processes of S802 and S803 in FIG. 8 may or may not be performed. Normal reproduction may be restarted from a frame which was reproduced at the time of pause. A method of performing the process of S1504 is not particularly limited. A process of S1505 is performed following the process of S1504.

As described above, according to the present embodiment, control information is acquired and reproduction is controlled according to the control information. A favorable image can be reproduced in a more reliable manner in a case where various reproduction operations are performed. In addition, an image creator or a user can set or change, as appropriate, processes performed by the image display apparatus in accordance with user operations. Furthermore, in the present embodiment, in a case where control information is not acquired, reproduction is controlled in a method similar to that of the first embodiment. Accordingly, even in a case where control information is not acquired, a favorable image can be reproduced in a more reliable manner in a case where various reproduction operations are performed.

Third Embodiment

Hereinafter, an image output apparatus and an image output method according to a third embodiment of the present invention will be described. In the present embodiment, an example of a case in which an image output apparatus is an imaging apparatus will be described. However, image output apparatuses to which the present invention is applicable are not limited to an imaging apparatus. For example, the present invention can also be applied to a personal computer, various recorders (a hard disk recorder, a Blu-ray recorder, a DVD recorder, and the like), various players (a Blu-ray player, a DVD player, and the like), a smartphone, and the like.

Figure 16:
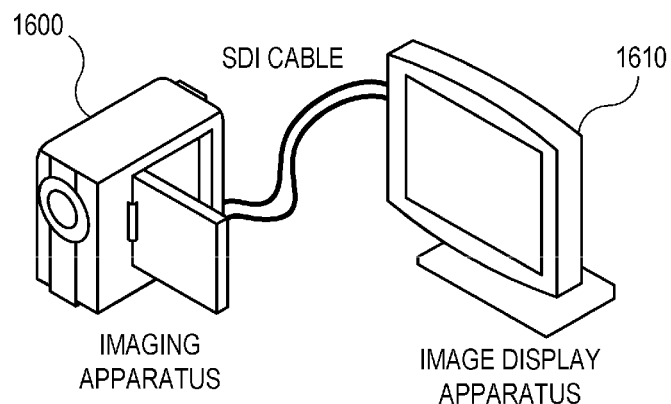
FIG. 16 is a diagram showing an example of an image display system according to a third embodiment.

FIG. 16 is a diagram showing an example of an image display system (image reproduction system) according to the present embodiment. The image display system according to the present embodiment includes an imaging apparatus 1600 and an image display apparatus (image reproduction apparatus) 1610. The imaging apparatus 1600 is connected to the image display apparatus 1610 using two SDI (Serial Digital Interface) cables. Moreover, the image display apparatus 1610 may be a display unit (a reproduction unit) provided on the imaging apparatus 1600.

The imaging apparatus 1600 is capable of generating high brightness HDR image data through imaging. The imaging apparatus 1600 is capable of outputting high brightness HDR image data generated through imaging to the image display apparatus 1610 via the two SDI cables. A method of transmitting high brightness HDR image data is not particularly limited. In the present embodiment, two streams are transmitted as high brightness HDR image data. A main stream which is one of the two streams stores LDR image data and a sub stream which is the other of the two streams stores difference data and metadata.

The image display apparatus 1610 is capable of reproducing (displaying) an image based on image data input to the image display apparatus 1610. The image display apparatus 1610 is capable of reproducing high brightness HDR images. As the image display apparatus 1610, a transmission liquid crystal display apparatus, a reflective liquid crystal display apparatus addition, a MEMS shutter system display apparatus which uses a MEMS shutter instead of liquid crystal elements, and the like can be used. A self-luminous image display apparatus such as an organic EL display apparatus and a plasma display apparatus can also be used as the image display apparatus 1610. A projector can also be used as the image display apparatus 1610. In the present embodiment, a transmission liquid crystal display apparatus is used as the image display apparatus 1610. In addition, in the present embodiment, both a resolution (number of pixels) of image data generated through imaging and a resolution (number of display elements) of a screen of the image display apparatus 1610 are full-HD. Moreover, these resolutions are not particularly limited.

Figure 17:
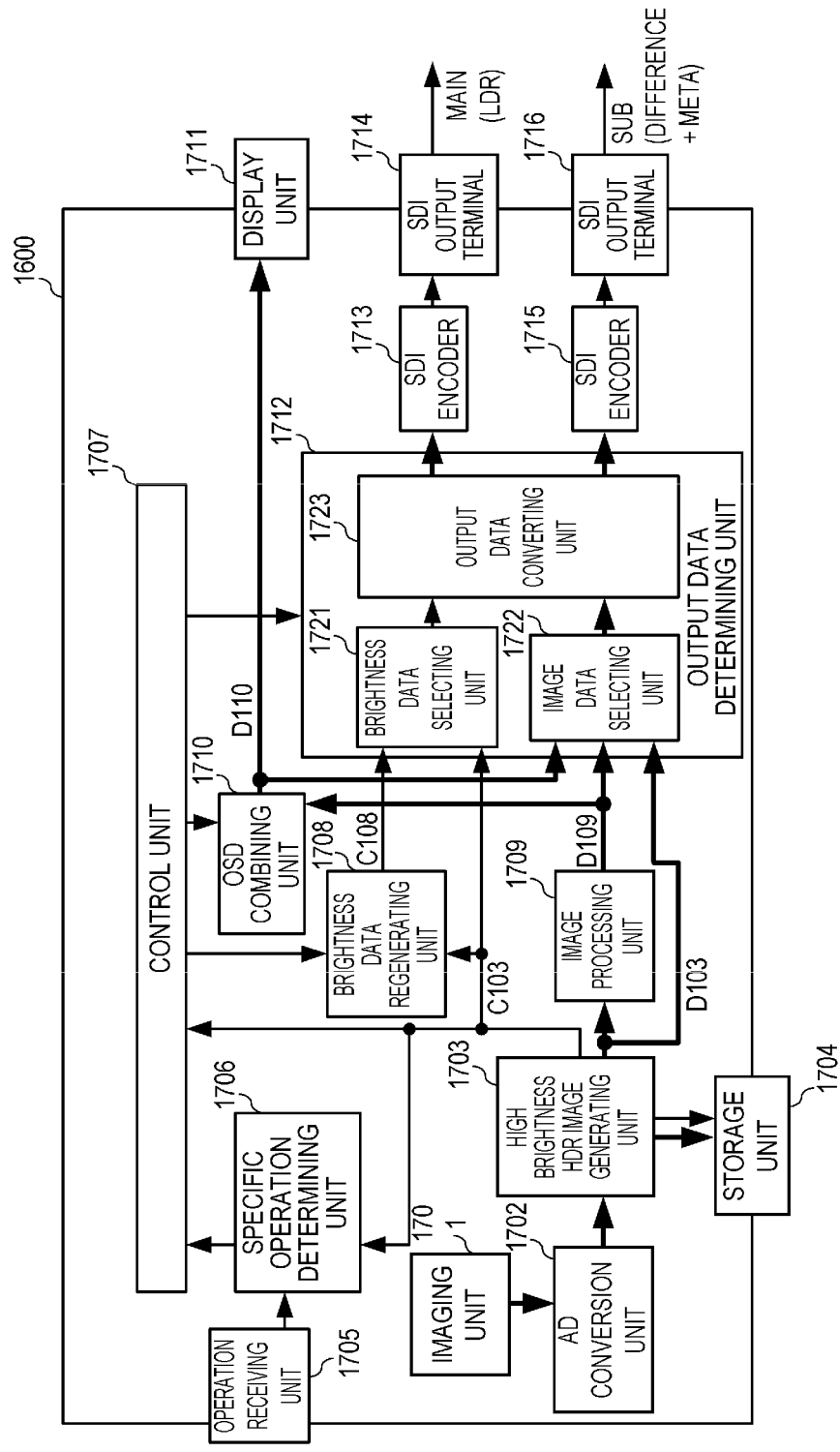
FIG. 17 is a block diagram showing an example of a functional configuration of an imaging apparatus according to the third embodiment.

FIG. 17 is a block diagram showing an example of a functional configuration of the imaging apparatus 1600. As shown in FIG. 17, the imaging apparatus 1600 includes an imaging unit 1701, an AD conversion unit 1702, a high brightness HDR image generating unit 1703, a storage unit 1704, an operation receiving unit 1705, a specific operation determining unit 1706, a control unit 1707, a brightness data regenerating unit 1708, an image processing unit 1709, an OSD combining unit 1710, a display unit 1711, an output data determining unit 1712, SDI encoders 1713 and 1715, and SDI output terminals 1714 and 1716. The output data determining unit 1712 includes a brightness data selecting unit 1721, an image data selecting unit 1722, and an output data converting unit 1723. While the respective functional units are connected to the control unit 1707 using control buses, a part of the control buses are omitted in FIG. 17.

Hereinafter, the respective functional units of the imaging apparatus 1600 will be described below in accordance with a processing flow of the imaging apparatus 1600. An example of a case where moving image data is output as image data that is a reproduction target (target image data) will be described below.

The imaging unit 1701 generates HDR image data that is an analog signal through imaging (photoelectric conversion). The imaging unit 1701 includes, for example, an image capturing element and an optical system. As the image capturing element, a CCD (Charge Coupled Device) sensor, a CMOS (Complementary Metal Oxide Semiconductor) sensor, and the like can be used.

The AD conversion unit 1702 converts the analog signal obtained by the imaging unit 1701 into a digital signal (AD conversion). Accordingly, HDR image data D103 that is a digital signal is obtained.

The high brightness HDR image generating unit 1703 generates high brightness HDR image data based on imaging parameters that were set at the time of imaging by the imaging unit 1701, a characteristic value of the HDR image data D103 obtained by the AD conversion unit 1702, and the like. Specifically, the high brightness HDR image generating unit 1703 generates brightness data C103 based on imaging parameters, a characteristic value of the HDR image data, and the like. As a result, high brightness HDR image data (a combination of the HDR image data D103 and the brightness data C103) is obtained. The high brightness HDR image generating unit 1703 associates the brightness data C103 with the HDR image data D103 so that synchronization is attained between the brightness data C103 and the HDR image data D103. In the present embodiment, the brightness data C103 is added to the HDR image data D103 as metadata. In addition, the high brightness HDR image generating unit 1703 outputs the brightness data C103, outputs the HDR image data D103, or outputs high brightness HDR image data (the HDR image data D103 with which the brightness data C103 has been associated). The brightness data C103 and the HDR image data D103 are output so that synchronization is attained between a process with respect to the brightness data C103 and a process with respect to the HDR image data D103.

The storage unit 1704 stores the high brightness HDR image data (the HDR image data D103 with which the brightness data C103 has been associated) generated by the high brightness HDR image generating unit 1703. As the storage unit 1704, a magnetic disk, an optical disk, a nonvolatile memory, or the like can be used. The storage unit 1704 may be or may not be a recording medium that is attachable to and detachable from the imaging apparatus 1600. For example, as the storage unit 1704, an internal memory may be used or an SD card may be used.

The operation receiving unit 1705 receives user operations with respect to the imaging apparatus 1600. User operations are performed using, for example, a remote controller or an operating unit. The operation receiving unit 1705 outputs an operation signal in accordance with the performed user operation to the specific operation determining unit 1706. The operation receiving unit 1705 accepts various user operations including a reproduction operation.

The specific operation determining unit 1706 determines whether or not the performed user operation is a specific reproduction operation based on the operation signal output from the operation receiving unit 1705 and the brightness data C103 output from the high brightness HDR image generating unit 1703.

The control unit 1707 controls processes of the respective functional units included in the imaging apparatus 1600. For example, the control unit 1707 controls output of data to the image display apparatus 1610 so that a moving image based on target image data is reproduced by the image display apparatus 1610 by a reproduction method in accordance with the performed reproduction operation. In addition, in a case where a specific reproduction operation is performed, the control unit 1707 controls output of data to the image display apparatus 1610 so that reproduction of an image whose brightness is higher than a first threshold is suppressed.

The brightness data regenerating unit 1708 generates brightness data C108 from the brightness data C103 in accordance with an instruction from the control unit 1707 and outputs the brightness data C108.

The image processing unit 1709 generates HDR image data D109 by performing predetermined image processing on the HDR image data D103 output from the high brightness HDR image generating unit 1703. Subsequently, the image processing unit 1709 outputs the generated HDR image data D109. The predetermined image processing is, for example, an image quality enhancing process for enhancing image quality of image data. Image quality enhancing processes include a gamma conversion process, a color conversion process, a brightness conversion process, an edge enhancement process, and a blurring process. As the predetermined image processing, one type of image processing may be performed or a plurality of types of image processing may be performed.

The OSD combining unit 1710 combines data of an OSD image onto the HDR image data D109 output from the image processing unit 1709 in accordance with an instruction from the control unit 1707. Accordingly, combine image data representing an image in which an OSD image is superimposed on an HDR image is generated. For example, the control unit 1707 instructs the OSD combining unit 1710 to combine an OSD image in accordance with a user operation. Subsequently, the OSD combining unit 1710 outputs HDR image data D110. In a case where combination of an OSD image is performed, combine image data is output as the HDR image data D110, but in a case where combination of an OSD image is not performed, HDR image data D109 is output as the HDR image data D110. As an OSD image, a UI (user interface) image such as a menu image is used. An image representing an operating state of the imaging apparatus 1600 may also be used as an OSD image.

The display unit 1711 displays an image based on the HDR image data D110 output from the OSD combining unit 1710. As the display unit 1711, a liquid crystal panel and a backlight unit, an organic EL display panel, a plasma display panel, or the like can be used. In the present embodiment, the display unit 1711 displays an HDR image represented by the HDR image data D110. For example, the display unit 1711 may display an image representing a current state of a subject, an image obtained by previously-performed imaging, or the OSD image described above.

The output data determining unit 1712 determines data to be output to the image display apparatus 1610 in accordance with an instruction from the control unit 1707.

The brightness data selecting unit 1721 selects the brightness data C103 output from the high brightness HDR image generating unit 1703 or the brightness data C108 output from the brightness data regenerating unit 1708 in accordance with an instruction from the control unit 1707. Subsequently, the brightness data selecting unit 1721 outputs the selected brightness data.

The image data selecting unit 1722 selects the HDR image data D103, the HDR image data D109, or the HDR image data D110 in accordance with an instruction from the control unit 1707. Subsequently, the image data selecting unit 1722 outputs the selected HDR image data.

The output data converting unit 1723 generates LDR image data and difference data based on the HDR image data output from the image data selecting unit 1722. In other words, the output data converting unit 1723 converts the HDR image data output from the image data selecting unit 1722 into LDR image data and difference data. The output data converting unit 1723 converts data formats of the LDR image data and the difference data into a data format of SDI and writes brightness data output from the brightness data selecting unit 1721 into an ancillary area of the difference data. Subsequently, the output data converting unit 1723 outputs the LDR image data and the difference data to which the brightness data has been added.

The SDI encoder 1713 converts parallel data input to the SDI encoder 1713 into serial data and outputs the serial data to the image display apparatus 1610 via the SDI output terminal 1714. The SDI encoder 1715 converts parallel data input to the SDI encoder 1715 into serial data and outputs the serial data to the image display apparatus 1610 via the SDI output terminal 1716. The LDR image data that constitutes a main stream is transmitted to the image display apparatus 1610 via the SDI encoder 1713 and the SDI output terminal 1714. The difference data and the brightness data that constitute a sub stream are transmitted to the image display apparatus 1610 via the SDI encoder 1715 and the SDI output terminal 1716. In the present embodiment, moving image data output from the SDI output terminals 1714 and 1716 is target image data. In addition, in the present embodiment, LDR image data and difference data are output as HDR image data. Therefore, in a case where LDR image data is output but difference data is not output, the target image data is the LDR image data. In a case where LDR image data and difference data are both output, the target image data is HDR image data.

Figure 18:
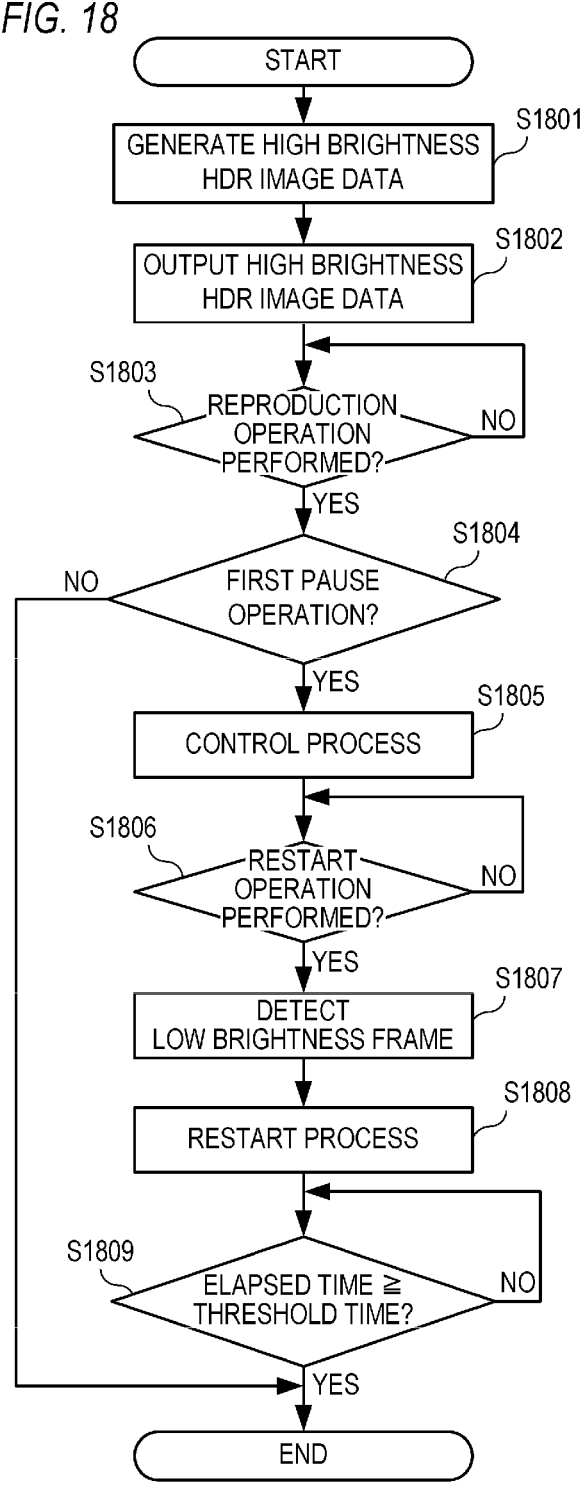
FIG. 18 is a flow chart showing an example of operations of the imaging apparatus according to the third embodiment.

Next, operations of the imaging apparatus 1600 will be described with reference to the flow chart in FIG. 18. The flow chart in FIG. 18 is started at a timing in a case where, for example, the HDR image data D103 is generated by the AD conversion unit 1702.

First, in S1801, the control unit 1707 instructs the high brightness HDR image generating unit 1703 to generate high brightness HDR image data. In accordance with the instruction from the control unit 1707, for each frame, the high brightness HDR image generating unit 1703 acquires a characteristic value of the HDR image data D103 of the frame. Subsequently, for each frame, the high brightness HDR image generating unit 1703 generates the brightness data C103 of the frame from the characteristic value of the frame. A method (an algorithm) for generating brightness data is not particularly limited.

Figure 19:
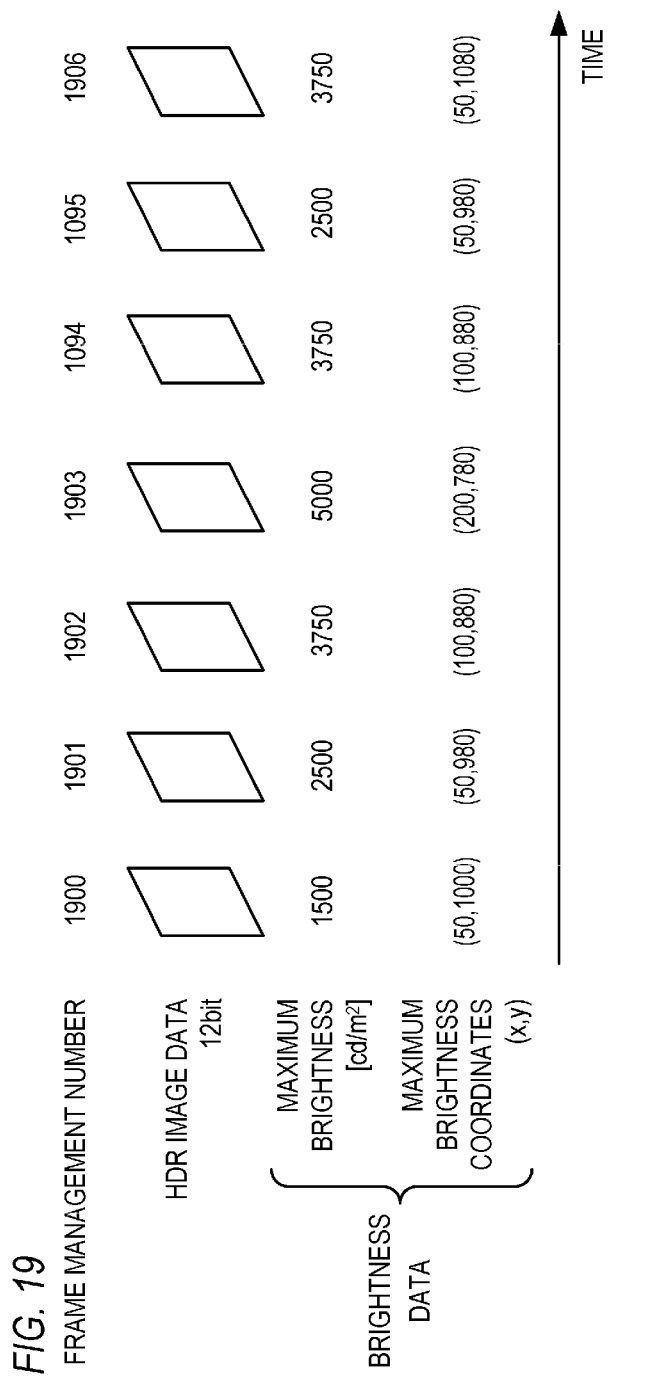
FIG. 19 is a diagram showing an example of a correspondence relationship between an HDR image and brightness according to the third embodiment.

FIG. 19 is a diagram showing an example of a correspondence relationship between the HDR image data D103 and the brightness data C103. The HDR image data D103 is assigned a frame management number corresponding to the HDR image data D103. The frame management number is used for, for example, attaining synchronization between a process with respect to the HDR image data D103 and a process with respect to the brightness data C103. Alternatively, a frame management number may be assigned to the brightness data C103 or frame management numbers may be assigned to both the HDR image data D103 and the brightness data C103.

In FIG. 19, as the brightness data C103, maximum brightness (a maximum value of brightness of a high brightness HDR image) of each frame and maximum brightness coordinates (coordinates of an image region having maximum brightness) of each frame are shown. In FIG. 19, a unit of maximum brightness is $[cd/m^2]$.

Moreover, while one maximum brightness value is associated with one frame in FIG. 19, a plurality of maximum brightness values may be associated with one frame. Let us now consider a case where a backlight unit includes a plurality of light sources respectively corresponding to a plurality of partial regions and, in addition, emission brightness of the plurality of light sources can be individually controlled. In a case where a plurality of partial regions are known in advance, a plurality of maximum brightness values corresponding to the plurality of partial regions can be associated with one frame. Maximum brightness corresponding to a partial region is a maximum value of brightness of a high brightness HDR image in the partial region.

Moreover, brightness data is not limited to the data shown in FIG. 19. For example, brightness data may include a size of an image region whose brightness equals maximum brightness. In a case where the number of display elements (the number of pixels) of the screen of the image display apparatus 1610 is known in advance, brightness data can include the number of display elements of a screen region which displays an image region whose brightness equals maximum brightness.

In the present embodiment, the imaging apparatus 1600 acknowledges, in advance, a range of obtainable values of brightness that can be reproduced by the image display apparatus 1610. Information indicating a range of obtainable values of brightness that can be reproduced by the image display apparatus 1610 may be or may not be acquired from the image display apparatus 1610 by a communicating unit (not shown). Information indicating a brightness range of a high brightness HDR image as defined in a standard or the like may be used as information indicating the range of obtainable values of brightness that can be reproduced by the image display apparatus 1610. Moreover, a unit of maximum brightness is not limited to $[cd/m^2]$. For example, a unit of maximum brightness may be [%]. Specifically, a proportion of a maximum value of brightness of a high brightness HDR image with respect to an upper limit value of brightness of the high brightness HDR image may be used as maximum brightness.

Following S1801, in S1802, the control unit 1707 controls the process of the output data determining unit 1712 so that HDR image data and brightness data are output to the image display apparatus 1610. Specifically, the control unit 1707 instructs the brightness data selecting unit 1721 to select the brightness data C103 and instructs the image data selecting unit 1722 to select the HDR image data D103. As a result, the brightness data C103 is transmitted from the brightness data selecting unit 1721 to the output data converting unit 1723 and the HDR image data D103 is transmitted from the image data selecting unit 1722 to the output data converting unit 1723. Subsequently, the control unit 1707 instructs the output data converting unit 1723 to convert the data. In accordance with the instruction from the control unit 1707, the output data converting unit 1723 converts the HDR image data output from the image data selecting unit 1722 into LDR image data and difference data. The output data converting unit 1723 converts data formats of the LDR image data and the difference data into a data format of SDI and adds brightness data output from the brightness data selecting unit 1721 to the difference data as metadata. Subsequently, the output data converting unit 1723 outputs the LDR image data and the difference data to which the brightness data has been added. As a result, the LDR image data is input to the image display apparatus 1610 as a main stream and the difference data to which brightness data has been added is input to the image display apparatus 1610 as a sub stream. In the present embodiment, in a case where LDR image data, difference data, and brightness data are input to the image display apparatus 1610, a high brightness HDR image is reproduced by the image display apparatus 1610. Therefore, a high brightness HDR image is reproduced by the process in S1802. Moreover, a method of reproducing high brightness HDR images is not particularly limited.

Figure 20:
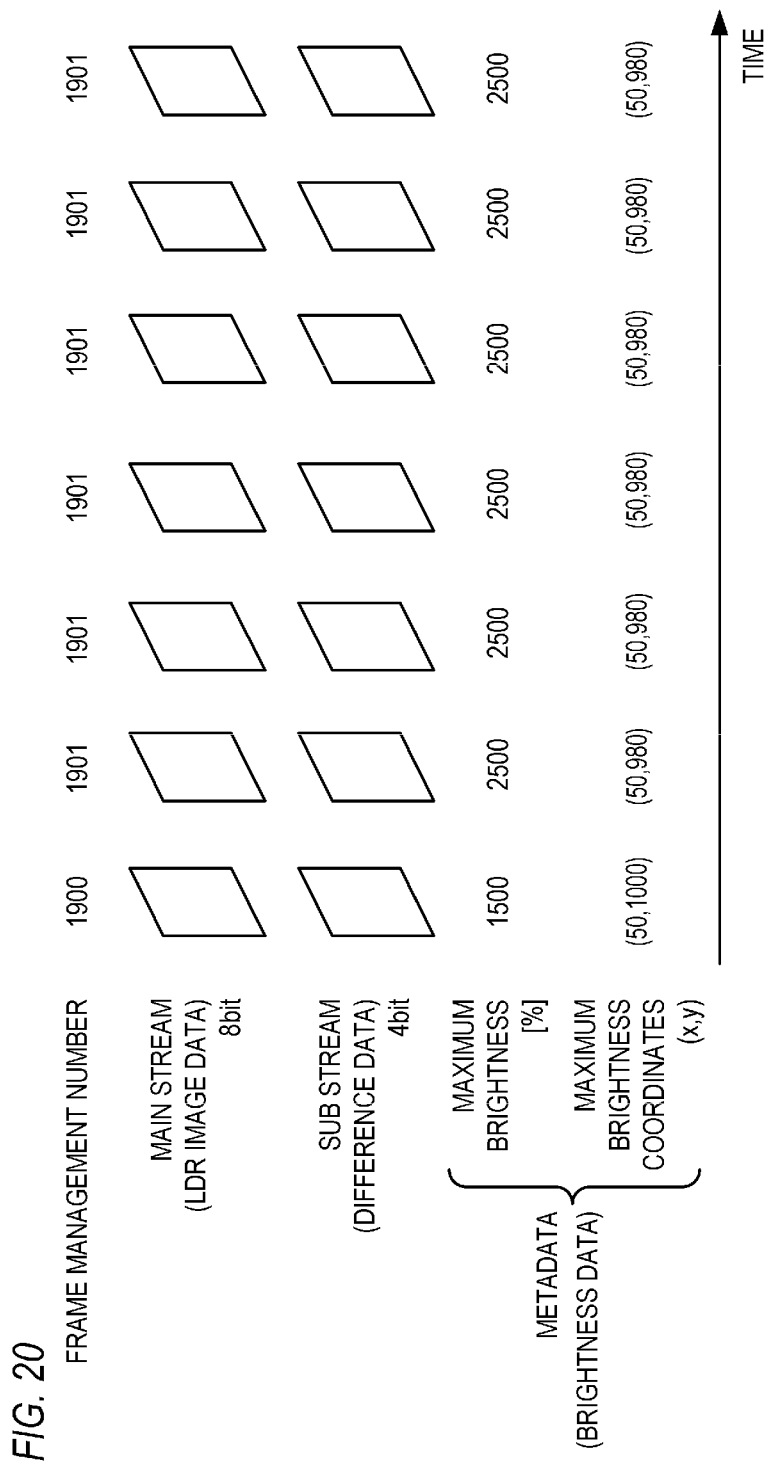
FIG. 20 is a diagram showing an example of output data of the imaging apparatus according to the third embodiment.

FIG. 20 is a diagram showing an example of data output by the imaging apparatus 1600. Unlike in FIG. 19, HDR image data is divided into LDR image data and difference data in FIG. 20.

Figure 21:
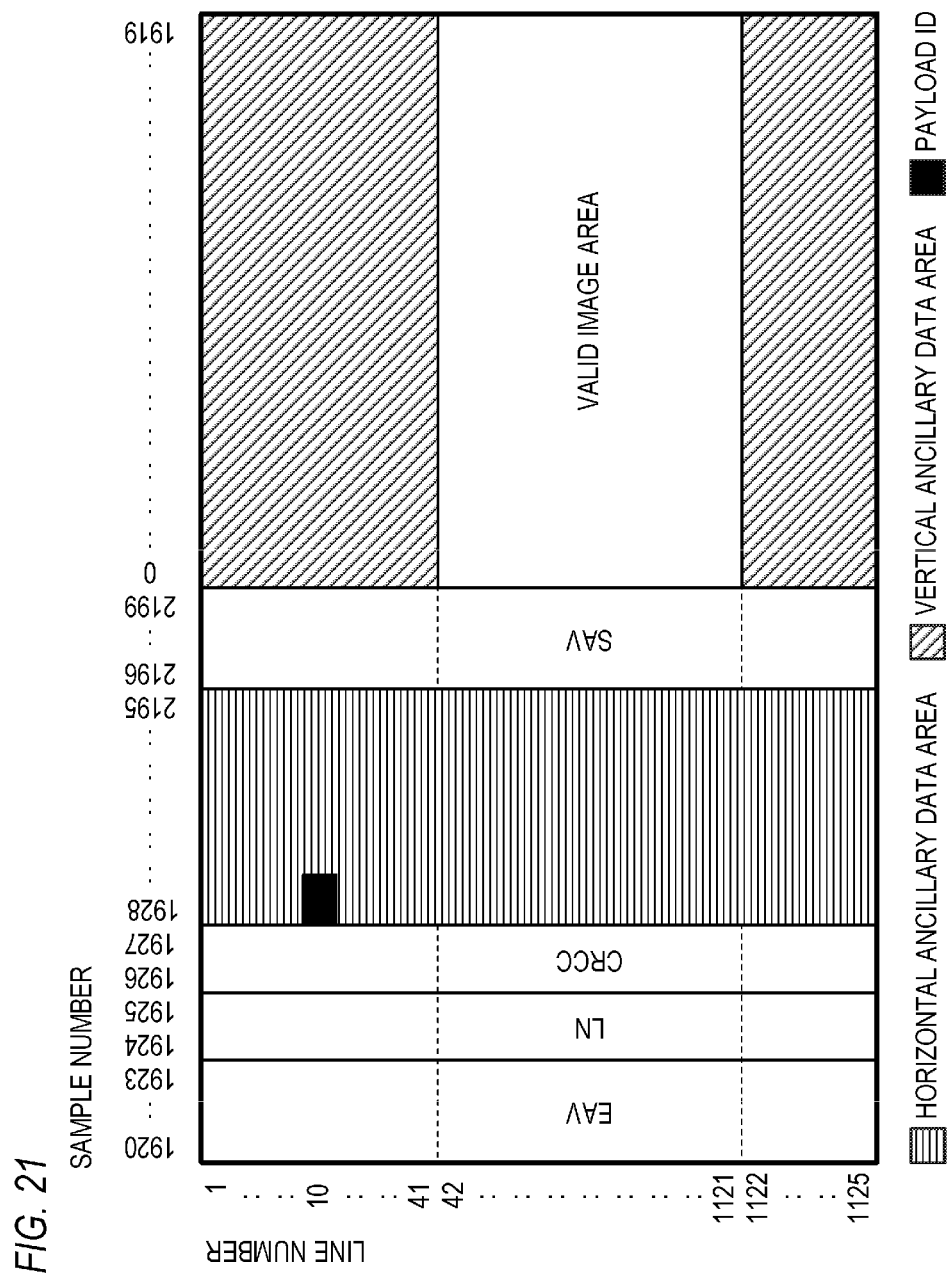
FIG. 21 is a diagram showing an example of a data structure of SDI data according to the third embodiment.

In S1802, the brightness data C103 is written into an ancillary area of SDI data. FIG. 21 shows an example of a data structure (a data map) of SDI data. The data map shown in FIG. 21 is a data map corresponding to one frame and is a full-HD data map. A vertical axis in FIG. 21 represents a line number and a horizontal axis in FIG. 21 represents a sample number. In FIG. 21, a region indicated by horizontal hatchings is an ancillary area capable of storing ancillary data (horizontal ancillary data). Therefore, the region indicated by the horizontal hatchings may be described as a "horizontal ancillary data region". A region indicated by diagonal hatchings is also an ancillary area capable of storing ancillary data (vertical ancillary data). Therefore, the region indicated by the diagonal hatchings may be described as a "vertical ancillary data region". In the present embodiment, brightness data is stored in the vertical ancillary data region of difference data that is SDI data.

EAV (End of Active Video) stores an identifier representing horizontal and vertical valid image area end points in a TRS (Timing Reference Signal) of SDI data. For example, EVF stores a synchronization identification code constituted by four words, [3FF], [000], [000], and [XYZ] as an identifier. EAV, SAV, field, and horizontal/vertical can be identified based on the contents of [XYZ].

LN (Line Number) stores data for monitoring a line number of SDI data. CRCC (Cyclic Redundancy Check Code) stores data for checking transmission errors in data in the valid image area, the EAV, and the LN.

SAV (Start of Active Video) stores an identifier representing horizontal and vertical valid image area start points in a TRS of SDI data. For example, SAV stores a synchronization identification code constituted by four words, [3FF], [000], [000], and [XYZ] as an identifier. EAV, SAV, field, and horizontal/vertical can be identified based on the contents of [XYZ].

Alternatively, the flow chart shown in FIG. 18 may be started at a timing in a case where the high brightness HDR image generating unit 1703 reads out the HDR image data D103 and the brightness data C103 from the storage unit 1704. In this case, LDR image data and difference data are generated from the read-out HDR image data and the generated LDR image data, the generated difference data, and the read-out brightness data are output to the image display apparatus 1610.

Following S1802, in S1803, the operation receiving unit 1705 awaits a reproduction operation. In a case where a reproduction operation has been performed, the process is advanced to S1804. Whether or not a reproduction operation has been performed can be determined by the control unit 1707 by analyzing an operation signal from the operation receiving unit 1705.

In S1804, the specific operation determining unit 1706 determines whether or not the reproduction operation performed in S1803 is a specific reproduction operation. In the present embodiment, a first pause operation is detected as the specific reproduction operation. Specifically, the control unit 1707 acquires the brightness data C103 of a frame or a scene that is currently being reproduced from the high brightness HDR image generating unit 1703 and outputs the acquired brightness data C103 to the specific operation determining unit 1706. In addition, the control unit 1707 determines whether or not the reproduction operation performed in S1803 is a pause operation by analyzing the operation signal obtained in S1803 and outputs a result of the determination to the specific operation determining unit 1706. Alternatively, the determination of the reproduction operation (the determination on whether or not the reproduction operation is a pause operation) may be performed in S1803. Subsequently, the specific operation determining unit 1706 compares maximum brightness indicated by the brightness data C103 with the first threshold. In addition, the specific operation determining unit 1706 determines whether or not the reproduction operation performed in S1803 is the first pause operation in accordance with the result of determination of the maximum brightness and the result of determination of the reproduction operation.

In a case where the reproduction operation is a pause operation and, at the same time, the maximum brightness is higher than the first threshold, the reproduction operation performed in S1803 is determined as the first pause operation and the process is advanced to S1805. Otherwise, the reproduction operation performed in S1803 is determined not to be the first pause operation, the present flow chart is ended, and the high brightness HDR image is reproduced by a reproduction method in accordance with the reproduction operation performed in S1803.

Figure 22:
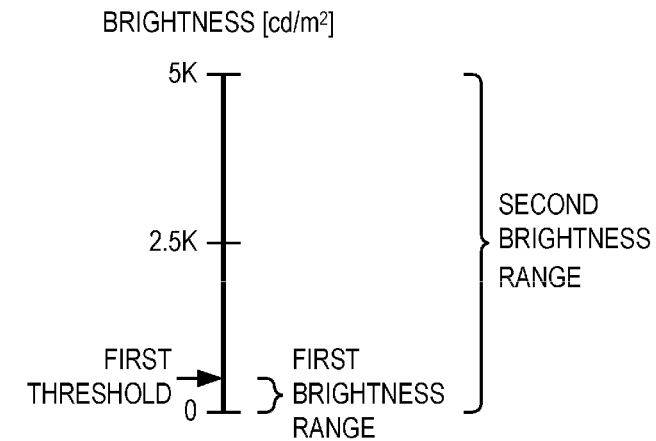
FIG. 22 is a diagram showing an example of a first threshold according to the third embodiment.

FIG. 22 is a diagram showing an example of the first threshold. FIG. 22 shows an example where a range of obtainable values of brightness of a high brightness HDR image is a range of 0 $[cd/m^2]$ or higher and 5000 $[cd/m^2]$ or lower. In the present embodiment, in a case where brightness data is input to the image display apparatus 1610, emission brightness of the backlight unit of the image display apparatus 1610 is controlled to a value based on the brightness data. A method of controlling emission brightness using brightness data is as described in the first and second embodiments. A range of obtainable values of emission brightness of the backlight unit can be changed between the first brightness range and the second brightness range. In a case where the first brightness range is used as a range of obtainable values of brightness of a high brightness HDR image, the first brightness range is also used as a range of obtainable values of emission brightness of the backlight unit. In a case where the second brightness range is used as a range of obtainable values of brightness of a high brightness HDR image, the second brightness range is also used as a range of obtainable values of emission brightness of the backlight unit. In FIG. 22, the first brightness range is a range from 0 [$cd/m^2$] to 500 [$cd/m^2$] and the second brightness range is a range from 0 [$cd/m^2$] to 5000 [$cd/m^2$]. In FIG. 22, 500 [$cd/m^2$] is set as the first threshold. For frame management number 1901 in FIG. 19, since maximum brightness is 2500 [$cd/m^2$] (>500 [$cd/m^2$]), a pause operation is determined to be the first pause operation.

Moreover, the first threshold may be higher or lower than 500 [$cd/m^2$]. The first threshold may be a fixed value set in advance by a manufacturer or a value that can be changed by the user. In addition, the first brightness range and the second brightness range may be set to any range as long as maximum emission brightness (a maximum value of emission brightness) of the second brightness range is higher than maximum emission brightness of the first brightness range. For example, the first brightness range may include only one emission brightness (such as 200 [$cd/m^2$]).

In S1805, the control unit 1707 performs a control process for controlling output of data to the image display apparatus 1610 so that reproduction of an image whose brightness is higher than a first threshold is suppressed. In the present embodiment, as the control process, a reduction process is performed in which output is controlled so that brightness of the reproduced moving image is reduced.

In the present embodiment, a gradation reduction process and a BL brightness reduction process are performed as reduction processes. First, the gradation reduction process according to the present embodiment will be described. The gradation reduction process according to the present embodiment is a process for controlling output so that a gradation value of target image data is reduced. Specifically, the gradation reduction process is a process for controlling output so that the target image data is changed from HDR image data to LDR image data. The control unit 1707 instructs the output data determining unit 1712 to stop output of difference data. As a result, output of difference data from the output data determining unit 1712 is stopped and the target image data is changed from HDR image data to LDR image data.

Moreover, a method of performing the gradation reduction process is not particularly limited. For example, the target image data may be changed from HDR image data to LDR image data in stages over a period of time corresponding to a plurality of frames. Alternatively, the gradation value of the target image data may be reduced to a value that is lower than the gradation value of the target image data by a predetermined value. A range of obtainable values of gradation values after the reduction may differ from the first gradation range (a range of gradation values of HDR image data).

Next, the BL brightness reduction process according to the present embodiment will be described. The BL brightness reduction process according to the present embodiment is a process for controlling output so that emission brightness of the backlight unit is reduced. Specifically, the BL brightness reduction process is a process for controlling output so that a range of obtainable values of emission brightness is changed from the second brightness range to the first brightness range. In the present embodiment, the brightness data C103 corresponding to the second brightness range is generated by the high brightness HDR image generating unit 1703 and the brightness data C108 corresponding to the first brightness range is generated by the brightness data regenerating unit 1708. The control unit 1707 instructs the brightness data selecting unit 1721 to select the brightness data C108. As a result, the brightness data output from the output data determining unit 1712 is changed from the brightness data C103 to the brightness data C108 and the range of obtainable values of emission brightness is changed from the second brightness range to the first brightness range.

Moreover, a method of performing the BL brightness reduction process is not particularly limited. For example, the brightness data output from the output data determining unit 1712 may be changed from the brightness data C103 to the brightness data C108 in stages over a period of time corresponding to a plurality of frames. Alternatively, the brightness data C108 may be generated from the brightness data C103 so that emission brightness is reduced to a value that is lower than the emission brightness in accordance with the brightness data C103 by a predetermined value. A range of obtainable values of emission brightness after the reduction may differ from the first brightness range.

As the BL brightness reduction process, a process for stopping output of brightness data to the image display apparatus 1610 may be performed. In a case where brightness data is not input to the image display apparatus 1610, the image display apparatus 1610 may control emission brightness of the backlight unit based on a characteristic value of the target image data. In such a case, favorably, the control unit 1707 causes the image processing unit 1709 to perform image processing and causes the image data selecting unit 1722 to select HDR image data D109. The image processing is image processing that takes control of emission brightness into consideration and is, for example, image processing that changes brightness, color, color gamut, gamma characteristics, contrast, or the like.

A specific example of operations of the brightness data regenerating unit 1708 will now be described with reference to FIGS. 19 and 20. Let us now consider a case where a pause operation is performed for frame management number 1901 in FIG. 19. In a case where it is determined in S1804 that the pause operation is the first pause operation, the brightness data regenerating unit 1708 generates the brightness data C108 from the brightness data C103. Moreover, the generation of the brightness data C108 may always be performed regardless of the determination result of S1804. The brightness data regenerating unit 1708 generates the brightness data C108 so that brightness in the first brightness range is regenerated by the image display apparatus 1610. For example, as shown in FIG. 20, brightness data indicating 200 [$cd/m^2$] that is a value within the first brightness range as maximum brightness of a frame represented by frame management number 1901 is generated as the brightness range C108. Since a pause operation is performed for the frame management number 1901, in FIG. 20, reproduced frame does not change from the frame represented by frame management number 1901.

A second switching process may be performed as the control process. The second switching process according to the present embodiment is a process for controlling output so that a frame that is a reproduction target (output target) is switched to a frame that does not include an image region whose brightness is higher than the first threshold. A frame after switching by the second switching process according to the present embodiment is not particularly limited in a similar manner to a frame after switching by the first switching process as described in the first embodiment. As the control process, a process for stopping output of all data to the image display apparatus 1610 may be performed.

Moreover, in a case of performing the control process, the control unit 1707 may notify the user of suppression information which indicates that display at high brightness is to be suppressed. For example, the control unit 1707 may instruct the OSD combining unit 1710 to combine an OSD image representing suppression information and instruct the image data selecting unit 1722 to select HDR image data D110. Accordingly, the OSD image representing the suppression information is displayed by the image display apparatus 1610 and the user is notified of the suppression information. In addition, the control process may also be performed in a case where combination of a UI image such as a menu image is performed by the OSD combining unit 1710.

In the present embodiment, the output data converting unit 1723 writes status information in an ancillary area (an ancillary area starting at coordinates (1928, 11)) of a line following a line on which a payload ID (a blacked-out region in FIG. 21) of the main stream exists. Status information is information indicating an output state of the imaging apparatus 1600. Output states of the imaging apparatus 1600 include output of HDR image data underway, output of LDR image data underway, and transition from LDR image data to HDR image data underway. By outputting such status information to the image display apparatus 1610, the image display apparatus 1610 can acknowledge image data input to the image display apparatus 1610.

Following S1805, in S1806, the operation receiving unit 1705 awaits a restart operation which is a user operation for instructing restart of reproduction of a high brightness HDR image. In a case where a restart operation is performed, processes of S1807 and thereafter are performed. A restart operation can also be described as "a user operation for starting normal reproduction". In the present embodiment, a restart operation can also be described as "a user operation for canceling reproduction by a reproduction method in accordance with the specific reproduction operation (the first pause operation)".

In S1807, the control unit 1707 detects a frame (a low brightness frame) which does not include an image region of a high brightness HDR image whose brightness is higher than the first threshold. In the present embodiment, a frame whose maximum brightness is equal to or lower than the first threshold is detected among a plurality of frames preceding a current output frame (a frame currently being output; a current reproduction frame). Specifically, a leading frame of a period of N-number of frames whose maximum brightness is equal to or lower than the first threshold is detected.

In addition, in S1808, the control unit 1707 controls output of data to the image display apparatus 1610 so that reproduction (normal reproduction) of a high brightness HDR image is restarted (restart process). In doing so, the control unit 1707 switches a frame that is a reproduction target (output target) to the frame detected in S1807 (a first switching process). As a result, a high brightness HDR image is reproduced from the frame detected in S1807. In the present embodiment, LDR image data, difference data, and the brightness data C103 are output to the image display apparatus 1610. In addition, a high brightness HDR image is reproduced using the LDR image data, the difference data, and the brightness data C103.

Next, in S1809, the control unit 1707 determines whether or not an elapsed time after restart of normal reproduction has reached a threshold time. The process of S1809 is repetitively performed until the elapsed time reaches the threshold time, and the present flow chart is ended once the elapsed time reaches the threshold time. In addition, the control unit 1707 disables reproduction operations during a period between the restart of normal reproduction and the lapse of the threshold time. Accordingly, reproduction operations cannot be accepted by the operation receiving unit 1705 during the period between the restart of normal reproduction and the lapse of the threshold time. As a result, a frequency of control processes can be reduced and a sense of discomfort (a sense of discomfort caused by a change in display due to the control process) which is felt by the user can be reduced. Moreover, the threshold time may be a fixed time set in advance by a manufacturer or a time that can be changed by the user.

Figure 23:
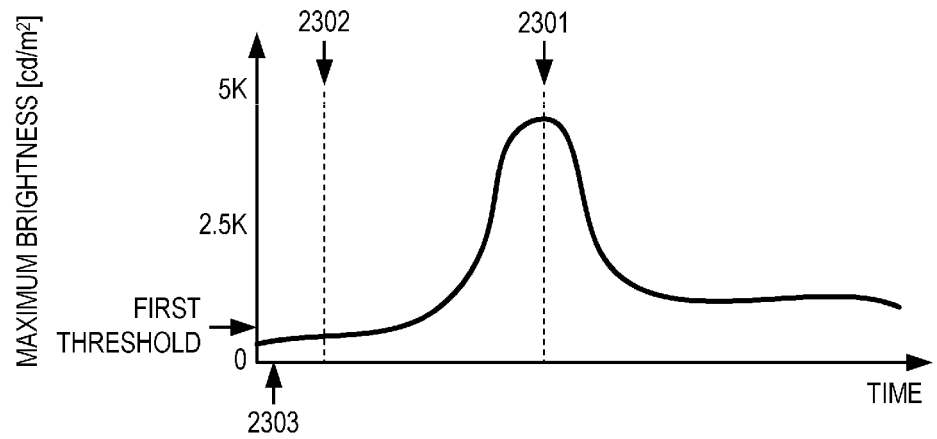
FIG. 23 is a diagram showing a specific example of a restart process according to the third embodiment.

A specific example of the restart process according to the present embodiment will be described with reference to FIG. 23. A vertical axis in FIG. 23 represents maximum brightness [cd/m$^2$] of a high brightness HDR image and a horizontal axis in FIG. 23 represents time. In this case, an example where a pause operation is performed during reproduction of frame 2301 and a restart process is subsequently performed will be described.

With conventional image display apparatuses, reproduction is restarted from a frame which was reproduced at the time of pause. However, in a case where reproduction is restarted from a frame or a scene with high brightness, excessive brightness of the display may inhibit visual recognition of images by the user. In consideration thereof, in the present embodiment, output of data to the image display apparatus 1610 is controlled so that reproduction is restarted from frame 2302 which is a leading frame of a period of N-number of frames whose maximum brightness is equal to or lower than the first threshold. Accordingly, restart of reproduction from a frame or a scene with high brightness can be suppressed.

Moreover, a control process may be continuously performed after a restart process and the control process may be canceled at an appropriate scene. An example of an appropriate scene is a scene included in the period of N-number of frames described above. The control unit 1707 detects the appropriate scene by, for example, pre-reading maximum brightness of frames subsequent to the current reproduction frame. The output may be controlled so that normal reproduction is restarted from frame 2303 in FIG. 23, LDR images are reproduced during a period from frame 2303 to frame 2302 and the reproduced image is switched from an LDR image to a high brightness HDR image at a timing of frame 2302. Alternatively, the output may be controlled so that a transition of the reproduced image from an LDR image to a high brightness HDR image is made in stages after the restart process.

Moreover, while an example in which the specific reproduction operation is the first pause operation has been described in the present embodiment, the specific reproduction operation is not limited thereto. For example, the specific reproduction operation may include at least any of the second pause operation, a first scaling operation, a second scaling operation, and a speed changing operation. The specific reproduction operation may not include the first pause operation.

Figure 24:
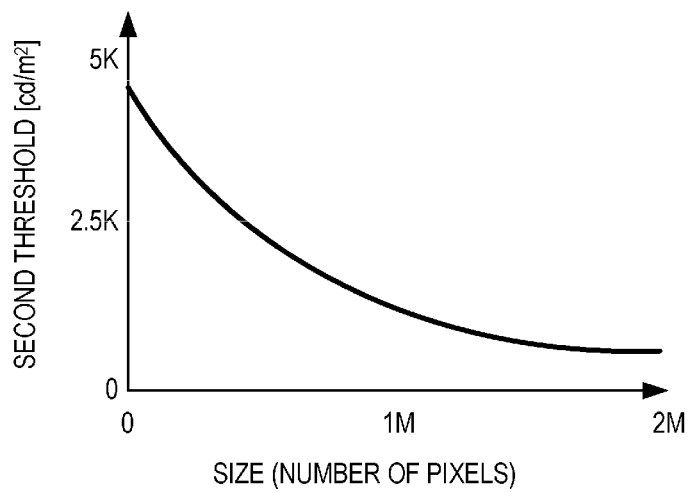
FIG. 24 is a diagram showing an example of a second threshold according to the third embodiment.

The second pause operation according to the present embodiment is a pause operation performed during reproduction of a frame including an image region whose brightness is higher than a first threshold and whose size is larger than a second threshold. FIG. 24 is a diagram showing an example of the second threshold. A vertical axis in FIG. 24 represents the second threshold [$cd/m^2$] and a horizontal axis in FIG. 24 represents a size (number of pixels) of an image region having maximum brightness. FIG. 24 shows, as the second threshold, a value that decreases as the size of an image region having maximum brightness increases. In the BL brightness reduction process, emission brightness of the backlight unit may be reduced by reducing BL brightness to the second threshold. In a case where the second pause operation is performed, a frame that is a reproduction target (output target) may be switched to a frame that does not include an image region whose brightness is higher than the first threshold and whose size is larger than the second threshold (a fourth switching process). The frame that is a reproduction target (output target) may be switched in the restart process to a frame that does not include an image region whose brightness is higher than the first threshold and whose size is larger than the second threshold (a third switching process).

Moreover, a frame after switching by the third switching process or the fourth switching process is not particularly limited in a similar manner to a frame after switching by the first switching process as described in the first embodiment. In addition, the second threshold is not limited to the value shown in FIG. 24. A value that is not dependent on the size of an image region having maximum brightness may be used as the second threshold. The second threshold may be a fixed value set in advance by a manufacturer or a value that can be changed by the user.

Moreover, a control process in a case where the first pause operation or the second pause operation is performed is not particularly limited. For example, reproduction of a high brightness image can be suppressed by performing at least any of the gradation reduction process, the BL brightness reduction process, the first switching process, and the second switching process as the control process.

The first scaling operation is a reproduction operation for changing an image size of target image data so that an image including an image region whose brightness is higher than the first threshold is reproduced. The second scaling operation is a reproduction operation for changing an image size of target image data so that an image including an image region whose brightness is higher than the first threshold and whose size is larger than the second threshold is reproduced. Scaling operations for changing an image size include an enlargement operation for enlarging an image and a reduction operation for reducing an image. In addition, scaling operations also include user operations for PbyP (Picture By Picture) display and PinP (Picture In Picture) display. In a case where the first scaling operation or the second scaling operation is performed, for example, at least one of the gradation reduction process and the BL brightness reduction process is performed as the control process.

A speed changing operation is a reproduction operation for changing a reproduction speed of a moving image based on target image data. Speed changing operations include a slow reproduction operation for reducing reproduction speed, reproduction operations for increasing reproduction speed (a fast forward operation and a fast rewind operation), and the like. In a case where a speed changing operation is performed, for example, at least one of the gradation reduction process and the BL brightness reduction process is performed as the control process. In a case where a speed changing operation is performed, a gradation value of image data or emission brightness of the backlight unit may be reduced by a reduction amount in accordance with the reproduction speed after the change.

Figure 25:
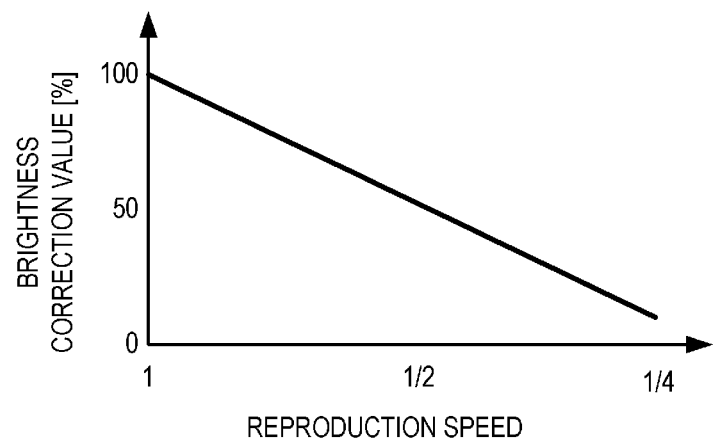
FIG. 25 is a diagram showing an example of a brightness correction value according to the third embodiment.

FIG. 25 shows an example of a brightness correction value in a case where a slow reproduction operation is performed. A vertical axis in FIG. 25 represents a brightness correction value and a horizontal axis in FIG. 25 represents reproduction speed. The brightness correction value is used in the BL brightness reduction process. The brightness correction value is a correction value that corrects brightness data (maximum brightness). FIG. 25 shows a multiplier value by which maximum brightness is to be multiplied as the brightness correction value. Moreover, the brightness correction value is not limited to a multiplier value. For example, an added value to be added to maximum brightness may be used as the brightness correction value. In FIG. 25, reproduction speed 1 denotes a normal reproduction speed. Therefore, the slow reproduction operation is a reproduction operation for reducing the reproduction speed to a value smaller than 1. In the example shown in FIG. 25, a brightness correction value that is smaller than 1 (100 [%]) is associated with a reproduction speed that is smaller than 1. In addition, since the slower the reproduction speed, the more likely that display at a high brightness is to be performed over a long period of time, a brightness correction value is associated with reproduction speed such that the slower the reproduction speed, the smaller the brightness correction value.

In a case where a slow reproduction operation is performed, maximum brightness is reduced using a brightness correction value that corresponds to the reproduction speed after change (BL brightness reduction process). In the example shown in FIG. 25, a brightness correction value of 50 [%] is associated with a reproduction speed of ½. Therefore, in a case where a slow reproduction operation for reducing the reproduction speed from 1 to ½ is performed, maximum brightness of 5000 [$cd/m^2$] is reduced to 2500 [$cd/m^2$].

As described above, according to the present embodiment, in a case where a specific reproduction operation is performed, output of data to the image display apparatus is controlled so that reproduction of an image whose brightness is higher than a first threshold is suppressed. Accordingly, favorable image data can be more reliably input to the image display apparatus in a case where various reproduction operations are performed and a favorable image can be reproduced by the image display apparatus in a case where various reproduction operations are performed.

Moreover, while an example in which brightness data is written into an ancillary area of SDI has been described in the present embodiment, a method of transmitting brightness data is not particularly limited. For example, brightness data may be transmitted during a blanking period of image data. In addition, while an example in which a control process is performed in accordance with the execution of a specific reproduction operation has been described in the present embodiment, a timing of execution of the control process is not limited thereto. For example, in a case where the image output apparatus is an imaging apparatus, the control process may also be performed in a case where at least one of the following is underway: imaging; exchanging of lenses used in the imaging; and checking of focus during the imaging. Furthermore, a range of gradation values of the target image data after the control process may be controlled in accordance with a type of lens currently being used.

Moreover, while an example where LDR image data, difference data, and brightness data are output to the image display apparatus has been described in the present embodiment, the example is not restrictive. For example, HDR image data and brightness data may be output. Alternatively, high brightness HDR image data may be output in a single stream. In addition, a method of outputting the various types of data is not particularly limited. For example, brightness data need not be stored in metadata. Three streams including a stream storing LDR image data, a stream storing difference data, and a stream storing brightness data may be output.

Fourth Embodiment

Hereinafter, an image output apparatus and an image output method according to a fourth embodiment of the present invention will be described. In the present embodiment, an example of a case in which an image output apparatus is an STB (set top box) will be described. In the third embodiment, an example in which an image output apparatus is connected to an image display apparatuses using SDI cables has been described. In the present embodiment, an example will be described in which an image output apparatus is connected to an image display apparatus using an HDMI (High-Definition Multimedia Interface) cable. Moreover, a method of connecting an image output apparatus and an image display apparatus to each other is not particularly limited. For example, an image output apparatus may be wirelessly connected to the image display apparatus so that communication can be performed.

Figure 26:
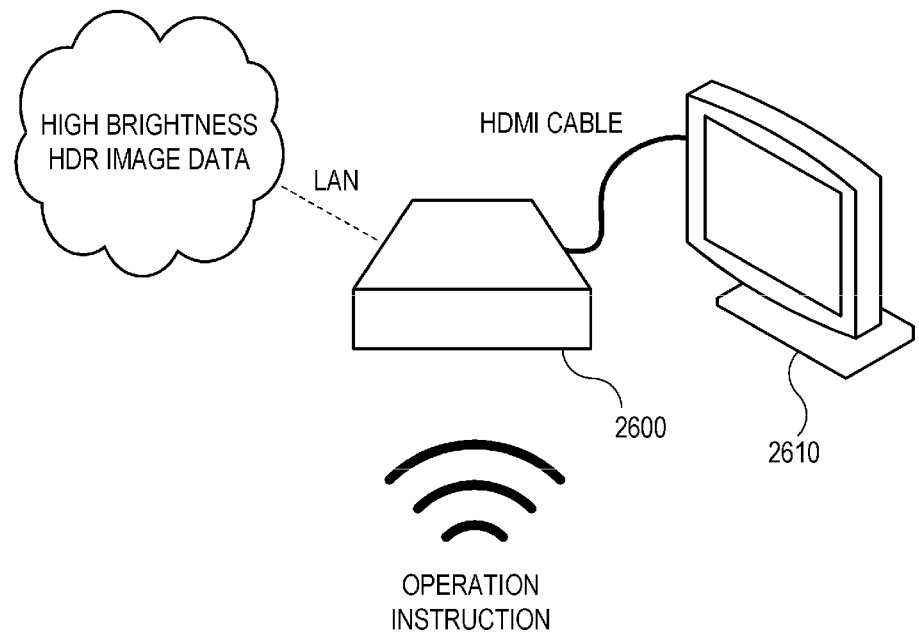
FIG. 26 is a diagram showing an example of an image display system according to a fourth embodiment.

FIG. 26 is a diagram showing an example of an image display system (image reproduction system) according to the present embodiment. The image display system according to the present embodiment includes an STB 2600 and an image display apparatus (image reproduction apparatus) 2610. The STB 2600 is connected to the image display apparatus 2610 using a single HDMI cable. Alternatively, the image display apparatus 2610 may be a display unit (a reproduction unit) provided on the STB 2600.

The STB 2600 is capable of acquiring high brightness HDR image data from a network via a LAN terminal and outputting the acquired high brightness HDR image data to the image display apparatus 2610 via the HDMI cable.

The image display apparatus 2610 is capable of reproducing (displaying) an image based on image data input to the image display apparatus 2610. The image display apparatus 2610 is capable of reproducing high brightness HDR images. Various image display apparatuses can be used as the image display apparatus 2610. In the present embodiment, a transmission liquid crystal display apparatus is used as the image display apparatus 2610.

Figure 27:
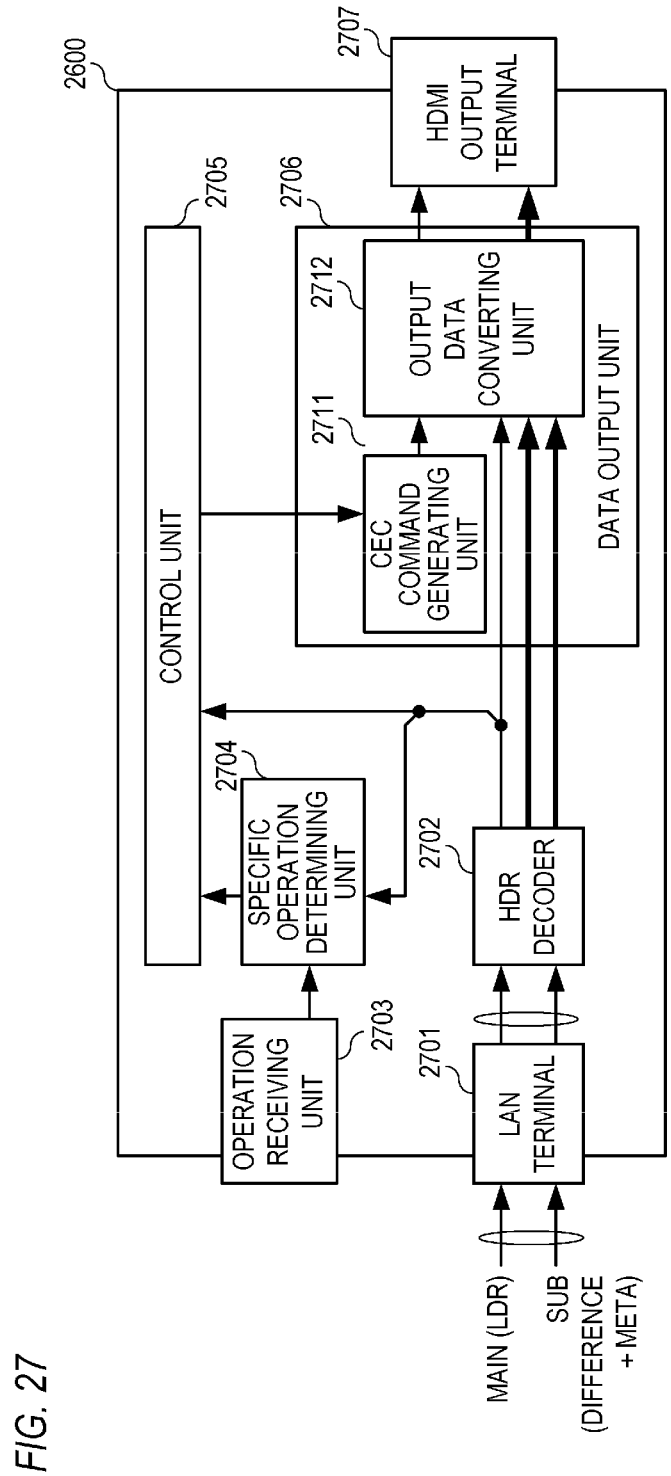
FIG. 27 is a block diagram showing an example of a functional configuration of an STB according to the fourth embodiment.

FIG. 27 is a block diagram showing an example of a functional configuration of the STB 2600. As shown in FIG. 27, the STB 2600 includes a LAN terminal 2701, an HDR decoder 2702, an operation receiving unit 2703, a specific operation determining unit 2704, a control unit 2705, a data output unit 2706, and an HDMI output terminal 2707. The data output unit 2706 includes a CEC command generating unit 2711 and an output data converting unit 2712. While the respective functional units are connected to the control unit 2705 using control buses, a part of the control buses are omitted in FIG. 27.

The LAN terminal 2701 is an interface that is used to acquire high brightness HDR image data from the network. In the present embodiment, a main stream that is LDR image data and a sub stream that is difference data are acquired as high brightness HDR image data. Metadata including brightness data has been added to the sub stream.

The HDR decoder 2702 decodes the high brightness HDR image data acquired from the network. Specifically, the HDR decoder 2702 respectively decodes a main stream and a sub stream (dual decoding). In addition, the HDR decoder 2702 further decodes the metadata having been added to the sub stream. As a result, LDR image data, difference data, and brightness data are acquired.

The operation receiving unit 2703 receives user operations with respect to the STB 2600. User operations are performed using, for example, a remote controller or an operating unit. The operation receiving unit 2703 outputs an operation signal in accordance with the performed user operation to the specific operation determining unit 2704. The operation receiving unit 2703 accepts various user operations including a reproduction operation.

The specific operation determining unit 2704 determines whether or not the performed user operation is a specific reproduction operation based on the operation signal output from the operation receiving unit 2703 and the brightness data output from the HDR decoder 2702.

The control unit 2705 controls processes of the respective functional units included in the STB 2600. For example, the control unit 2705 controls processing by the data output unit 2706 so that a process of generating control data for controlling processing by the image display apparatus 2610 and a process of outputting the generated control data to the image display apparatus 2610 are performed. In a case where a reproduction operation is performed, control data is generated for controlling reproduction by the image display apparatus 2610 so that a moving image based on target image data is reproduced by a reproduction method in accordance with the performed reproduction operation, and the generated control data is output to the image display apparatus 2610. In a case where a specific reproduction operation is performed, control data is generated for further controlling reproduction by the image display apparatus 1610 so that reproduction of an image whose brightness is higher than a first threshold is suppressed. In addition, the image display apparatus 2610 performs reproduction according to the control data. While a format of the control data is not particularly limited, in the present embodiment, a CEC command is used as control data.

The data output unit 2706 generates a CEC command in accordance with an instruction from the control unit 2705. In addition, the data output unit 2706 outputs the generated CEC command and the high brightness HDR image data (LDR image data, difference data, and brightness data) to the image display apparatus 2610 via the HDMI output terminal 2707.

The CEC command generating unit 2711 generates an HDMI CEC command in accordance with an instruction from the control unit 2705. The output data converting unit 2712 converts data formats of the LDR image data, the difference data, and the brightness data into TMDS which is a data format of HDMI and outputs the converted data to the image display apparatus 2610 via the HDMI output terminal 2707. The LDR image data that constitutes the main stream and the difference data that constitutes the sub stream are output in a multi-stream format. The brightness data is output as metadata. In addition, the output data converting unit 2712 outputs the CEC command generated by the CEC command generating unit 2711 to the image display apparatus 2610 using a CEC line.

Figure 28:
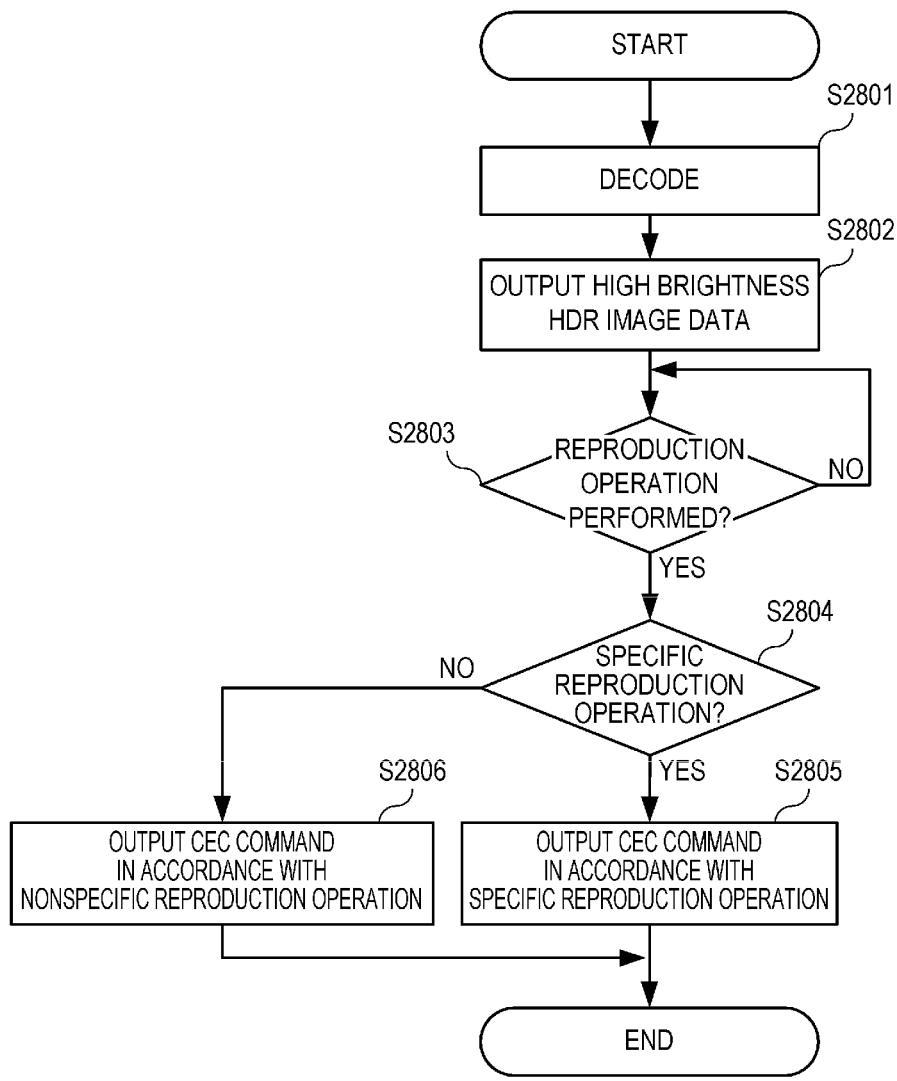
FIG. 28 is a flow chart showing an example of operations of the STB according to the fourth embodiment.

Next, operations of the STB 2600 will be described with reference to the flow chart in FIG. 28. The flow chart in FIG. 28 is started at a timing in a case where, for example, the HDR decoder 2702 acquires high brightness HDR image data (a main stream and a sub stream) from the network.

First, in S2801, the HDR decoder 2702 decodes the acquired main stream and the acquired sub stream (including metadata). As a result, LDR image data, difference data, and brightness data are obtained.

Next, in S2802, the data output unit 2706 outputs the high brightness HDR image data (the LDR image data, the difference data, and the brightness data) obtained in S2801 to the image display apparatus 2610 via the HDMI output terminal 2707. Accordingly, a normal reproduction of a high brightness HDR image is performed by the image display apparatus 2610. At this point, a CEC command for normal reproduction may be output to the image display apparatus 2610.

In addition, in S2803, the operation receiving unit 2703 awaits a reproduction operation. In a case where a reproduction operation has been performed, the process is advanced to S2804. Whether or not a reproduction operation has been performed can be determined by the control unit 2705 by analyzing an operation signal from the operation receiving unit 2703.

In S2804, the specific operation determining unit 2704 determines whether or not the reproduction operation performed in S2803 is a specific reproduction operation. In a case where the reproduction operation performed in S2803 is the specific reproduction operation, the process is advanced to S2805, and in a case where the reproduction operation performed in S2803 is not the specific reproduction operation, the process is advanced to S2806.

In S2805, the control unit 2705 instructs the data output unit 2706 to generate and output a CEC command in accordance with the specific reproduction operation performed in S2803. Accordingly, a CEC command in accordance with the specific reproduction operation performed in S2803 is generated by the CEC command generating unit 2711. Subsequently, the output data converting unit 2712 outputs the high brightness HDR image data obtained in S2801 and the CEC command in accordance with the specific reproduction operation performed in S2803 to the image display apparatus 2610. The image display apparatus 2610 controls reproduction according to the CEC command input to the image display apparatus 2610. Therefore, reproduction is controlled in accordance with the specific reproduction operation performed in S2803.

The CEC command in accordance with the specific reproduction operation is control data for controlling reproduction by the image display apparatus 2610 so that a moving image based on target image data is reproduced by a reproduction method in accordance with the specific reproduction operation. For example, in a case where the specific reproduction operation is a pause operation, a CEC command for stopping the reproduction is generated. In a case where the specific reproduction operation is a scaling operation, a CEC command for changing an image size of image data that is a reproduction target is generated. In addition, in a case where the specific reproduction operation is a speed changing operation, a CEC command for changing a reproduction speed is generated. Furthermore, the CEC command in accordance with the specific reproduction operation is also control data for further controlling reproduction by the image display apparatus 1610 so that reproduction of an image whose brightness is higher than a first threshold is suppressed. For example, the CEC command in accordance with the specific reproduction operation is control data for instructing an execution of the control processes (the gradation reduction process, the BL brightness reduction process, a switching process such as the second switching process, and the like described in the first embodiment) which are described in the first embodiment.

In S2806, the control unit 2705 instructs the data output unit 2706 to generate and output a CEC command in accordance with the reproduction operation (a reproduction operation that is not the specific reproduction operation; a nonspecific operation) performed in S2803. Accordingly, a CEC command in accordance with the nonspecific operation performed in S2803 is generated by the CEC command generating unit 2711. Subsequently, the output data converting unit 2712 outputs the high brightness HDR image data obtained in S2801 and the CEC command in accordance with the nonspecific operation performed in S2803 to the image display apparatus 2610. As a result, reproduction is controlled in accordance with the nonspecific operation performed in S2803.

The CEC command in accordance with the nonspecific operation is control data for controlling reproduction by the image display apparatus 2610 so that a moving image based on target image data is reproduced by a reproduction method in accordance with the nonspecific operation. For example, in a case where the nonspecific operation is a pause operation, a CEC command for stopping the reproduction is generated. In a case where the nonspecific operation is a scaling operation, a CEC command for changing an image size of image data that is a reproduction target is generated. In addition, in a case where the nonspecific operation is a speed changing operation, a CEC command for changing a reproduction speed is generated.

As described above, according to the present embodiment, the image output apparatus controls control data to be output to the image display apparatus in accordance with a reproduction operation that has been performed. In addition, in a case where a specific reproduction operation is performed, control data for controlling reproduction by the image display apparatus so as to suppress reproduction of an image whose brightness is higher than a first threshold is output to the image display apparatus. Accordingly, the image display apparatus can be caused to perform desired reproduction and a favorable image can be reproduced by the image display apparatus in a case where various reproduction operations are performed.

Moreover, while an example where a control command is output from the image output apparatus without changing target image data and brightness data at the image output apparatus has been described in the present embodiment, this example is not restrictive. Even in the present embodiment, target image data and brightness data may be changed at the image output apparatus in a similar manner to the third embodiment. Display at high brightness, display at high brightness over a long period of time, and the like may be suppressed by enabling target image data and brightness data to be changed at both the image output apparatus and the image display apparatus.

Moreover, while an example where various types of data are output to the image display apparatus using an HDMI cable has been described in the present embodiment, the example is not restrictive. For example, a DP (Display Port)

cable may be used. In a case of using a DP (Display Port) cable, an AUX command may be generated as control data and the AUX command may be output to the image display apparatus using an AUX line. In addition, data formats of LDR image data, difference data, and brightness data may be converted into a data format of DP and the converted data may be output to the image display apparatus.

Moreover, while an example where LDR image data, difference data, and brightness data are input to an image output apparatus has been described in the present embodiment, the example is not restrictive. For example, HDR image data and brightness data may be input. Alternatively, high brightness HDR image data may be input in a single stream. In addition, a method of inputting (acquiring) the various types of data is not particularly limited. For example, brightness data need not be stored in metadata. Three streams including a stream storing LDR image data, a stream storing difference data, and a stream storing brightness data may be input.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-114245, filed on Jun. 4, 2015, which is hereby incorporated by reference herein in its entirety.

REFERENCE SIGNS

100, 1200: image display apparatus
104: liquid crystal panel
109: backlight unit
110, 1705, 2703: operation receiving unit
112, 1202: reproduction control unit
1600: imaging apparatus
1707, 2705: control unit
1712: output data determining unit
2600: STB
2706: data output unit

The invention claimed is:

1. An image display apparatus comprising:
    a display unit configured to include a display panel and to display a moving image based on input moving image data;
    a reception interface configured to receive a user operation; and
    a controller configured to reduce display brightness of the display unit in a case where, during reproduction of a moving image including an image region of which brightness is higher than a first threshold, the reception interface receives a specific reproduction operation that includes:
        a first pause operation for temporarily stopping the reproduction of the moving image to be performed during displaying of a frame including an image region of which brightness is higher than the first threshold;
        a second pause operation for temporarily stopping the reproduction of the moving image to be performed during displaying of a frame including an image region of which brightness is higher than the first threshold and of which size is larger than a second threshold;
        a first scaling operation for changing an image size of the moving image data so that a moving image including an image region of which brightness is higher than the first threshold is displayed; or
        a second scaling operation for changing the image size of the moving image data so that a moving image including an image region of which brightness is higher than the first threshold and of which size is larger than a second threshold is displayed.

2. The image display apparatus according to claim 1, wherein
    in a case where the first pause operation is performed, the controller switches a frame that is a display target to a frame that does not include an image region of which brightness is higher than the first threshold.

3. The image display apparatus according to claim 1, wherein
    in a case where the second pause operation is performed, the controller switches a frame that is a display target to a frame that does not include an image region of which brightness is higher than the first threshold and of which size is larger than the second threshold.

4. The image display apparatus according to claim 1, wherein
    in a case where a user operation for canceling reproduction by a reproduction method in accordance with the first pause operation is performed, the controller switches a frame that is a display target so that display starts from a frame that does not include an image region of which brightness is higher than the first threshold.

5. The image display apparatus according to claim 1, wherein
    in a case where a user operation for canceling reproduction by a reproduction method in accordance with the second pause operation is performed, the controller switches a frame that is a display target so that display starts from a frame that does not include an image region of which brightness is higher than the first threshold and of which size is larger than the second threshold.

6. The image display apparatus according to claim 1, wherein
the display unit includes a light source and the display panel which displays a moving image by modulating light emitted from the light source, and
the controller reduces the display brightness of the display unit by a process for reducing emission brightness of the light source.

7. The image display apparatus according to claim 6, wherein
a range of obtainable values of the emission brightness can be changed between a first brightness range and a second brightness range with a higher maximum value of the emission brightness than the first brightness range, and
the process for reducing the emission brightness is a process for changing a range of obtainable values of the emission brightness from the second brightness range to the first brightness range.

8. The image display apparatus according to claim 1, wherein
the controller reduces the display brightness of the display unit by a process for reducing a gradation value of the moving image data.

9. The image display apparatus according to claim 8, further comprising at least one processor which functions as:
a first acquiring unit configured to acquire first moving image data in which a range of obtainable values of a gradation value is a first gradation range;
a second acquiring unit configured to acquire difference data related to a difference between the first moving image data and second moving image data in which a range of obtainable values of a gradation value is a second gradation range with a larger maximum value of the gradation value than the first gradation range; and
a generating unit configured to generate the second moving image data based on the first moving image data and the difference data, wherein
the process for reducing a gradation value of the moving image data is a process for changing the moving image data from the second moving image data to the first moving image data.

10. The image display apparatus according to claim 1, further comprising at least one processor which functions as:
a determining unit configured to determine whether or not the specific reproduction operation has been performed, wherein
the controller reduces the display brightness of the display unit based on a determination result of the determining unit.

11. The image display apparatus according to claim 10, further comprising at least one processor which functions as:
an acquiring unit configured to acquire brightness data related to brightness of the moving image data, wherein
a determining unit determines whether or not the specific reproduction operation has been performed based on the user operation and the brightness data.

12. The image display apparatus according to claim 1, wherein
the specific reproduction operation includes a slow reproduction operation for reducing a reproduction speed of the moving image data.

13. The image display apparatus according to claim 1, wherein
the moving image data is high brightness HDR (High Dynamic Range) image data that is intended to be reproduced by an image display apparatus capable of realizing display of which brightness is higher than the first threshold.

14. An image output apparatus comprising:
an output interface configured to output moving image data to a display apparatus;
a reception interface configured to receive a user operation; and
a controller configured to reduce display brightness of the display apparatus by controlling output of the output interface in a case where, during reproduction of a moving image including an image region of which brightness is higher than a first threshold, the reception interface receives a specific reproduction operation that includes:
a first pause operation for temporarily stopping the reproduction of the moving image to be performed during displaying of a frame including an image region of which brightness is higher than the first threshold;
a second pause operation for temporarily stopping the reproduction of the moving image to be performed during displaying of a frame including an image region of which brightness is higher than the first threshold and of which size is larger than a second threshold;
a first scaling operation for changing an image size of the moving image data so that a moving image including an image region of which brightness is higher than the first threshold is displayed; or
a second scaling operation for changing the image size of the moving image data so that a moving image including an image region of which brightness is higher than the first threshold and of which size is larger than a second threshold is displayed.

15. The image output apparatus according to claim 14, wherein
the display apparatus includes a light source and a display panel which displays a moving image by modulating light emitted from the light source, and
the controller reduces the display brightness of the display apparatus by controlling the output so that emission brightness of the light source is reduced.

16. The image output apparatus according to claim 14, wherein
the controller reduces the display brightness of the display apparatus by controlling the output so that a gradation value of the moving image data is reduced.

17. A control method for an image display apparatus which includes a display unit configured to include a display panel and to display a moving image based on input moving image data, the control method comprising:
a reception step of receiving a user operation; and
a control step of reducing display brightness of the display unit in a case where, during reproduction of a moving image including an image region of which brightness is higher than a first threshold, a specific reproduction operation is received in the reception step, the specific reproduction operation including:
a first pause operation for temporarily stopping the reproduction of the moving image to be performed during displaying of a frame including an image region of which brightness is higher than the first threshold;

a second pause operation for temporarily stopping the reproduction of the moving image to be performed during displaying of a frame including an image region of which brightness is higher than the first threshold and of which size is larger than a second threshold;

a first scaling operation for changing an image size of the moving image data so that a moving image including an image region of which brightness is higher than the first threshold is displayed; or a second scaling operation for changing the image size of the moving image data so that a moving image including an image region of which brightness is higher than the first threshold and of which size is larger than a second threshold is displayed.

18. A control method for an image output apparatus which includes an output interface that outputs moving image data to a display apparatus, the control method comprising:

a reception step of receiving a user operation; and a control step of reducing display brightness of the display apparatus by controlling output of the output interface in a case where, during reproduction of a moving image including an image region of which brightness is higher than a first threshold, a specific reproduction operation is received in the reception step, the specific reproduction operation including:

a first pause operation for temporarily stopping the reproduction of the moving image to be performed during displaying of a frame including an image region of which brightness is higher than the first threshold;

a second pause operation for temporarily stopping the reproduction of the moving image to be performed during displaying of a frame including an image region of which brightness is higher than the first threshold and of which size is larger than a second threshold;

a first scaling operation for changing an image size of the moving image data so that a moving image including an image region of which brightness is higher than the first threshold is displayed; or a second scaling operation for changing the image size of the moving image data so that a moving image including an image region of which brightness is higher than the first threshold and of which size is larger than a second threshold is displayed.

19. A non-transitory computer readable medium that stores a program, wherein the program causes a computer to execute a control method for an image display apparatus which includes a display unit configured to include a display panel and to display a moving image based on input moving image data, the control method comprising:

a reception step of receiving a user operation; and a control step of reducing display brightness of the display unit in a case where, during reproduction of a moving image including an image region of which brightness is higher than a first threshold, a specific reproduction operation is received in the reception step, the specific reproduction operation including:

a first pause operation for temporarily stopping the reproduction of the moving image to be performed during displaying of a frame including an image region of which brightness is higher than the first threshold;

a second pause operation for temporarily stopping the reproduction of the moving image to be performed during displaying of a frame including an image region of which brightness is higher than the first threshold and of which size is larger than a second threshold;

a first scaling operation for changing an image size of the moving image data so that a moving image including an image region of which brightness is higher than the first threshold is displayed; or a second scaling operation for changing the image size of the moving image data so that a moving image including an image region of which brightness is higher than the first threshold and of which size is larger than a second threshold is displayed.

20. A non-transitory computer readable medium that stores a program, wherein the program causes a computer to execute a control method for an image output apparatus which includes an output interface that outputs moving image data to a display apparatus, the control method comprising:

a reception step of receiving a user operation; and a control step of reducing display brightness of the display apparatus by controlling output of the output interface in a case where, during reproduction of a moving image including an image region of which brightness is higher than a first threshold, a specific reproduction operation is received in the reception step, the specific reproduction operation including:

a first pause operation for temporarily stopping the reproduction of the moving image to be performed during displaying of a frame including an image region of which brightness is higher than the first threshold;

a second pause operation for temporarily stopping the reproduction of the moving image to be performed during displaying of a frame including an image region of which brightness is higher than the first threshold and of which size is larger than a second threshold;

a first scaling operation for changing an image size of the moving image data so that a moving image including an image region of which brightness is higher than the first threshold is displayed; or a second scaling operation for changing the image size of the moving image data so that a moving image including an image region of which brightness is higher than the first threshold and of which size is larger than a second threshold is displayed.

* * * * *